(12) United States Patent
Raymond et al.

(10) Patent No.: US 7,731,813 B2
(45) Date of Patent: *Jun. 8, 2010

(54) MANUFACTURE OF DISPLAY DEVICES WITH ULTRATHIN LENS ARRAYS FOR VIEWING INTERLACED IMAGES

(75) Inventors: Mark A. Raymond, Littleton, CO (US); Howard G. Lange, Mount Prospect, IL (US)

(73) Assignee: Genie Lens Technologies, LLC, Englewood, CO (US)

( * ) Notice: Subject to any disclaimer, the term of this patent is extended or adjusted under 35 U.S.C. 154(b) by 236 days.

This patent is subject to a terminal disclaimer.

(21) Appl. No.: 12/032,797

(22) Filed: Feb. 18, 2008

(65) Prior Publication Data

US 2008/0150174 A1  Jun. 26, 2008

Related U.S. Application Data

(63) Continuation of application No. 11/558,541, filed on Nov. 10, 2006, now Pat. No. 7,359,120.

(51) Int. Cl.
*B29D 11/00* (2006.01)

(52) U.S. Cl. .................... 156/102; 156/277; 156/272.2; 156/219

(58) Field of Classification Search .................. 156/99, 156/100, 102, 196, 219, 220, 245, 272.2, 156/277; 359/626, 619, 618, 628, 454, 455, 359/456, 457, 458; 40/454
See application file for complete search history.

(56) References Cited

U.S. PATENT DOCUMENTS

| 4,164,748 A | 8/1979 | Nagata |
| 4,387,959 A | 6/1983 | Lange et al. |
| 4,480,893 A | 11/1984 | Frantone |
| 5,012,274 A | 4/1991 | Dolgoff |
| 5,616,912 A | 4/1997 | Robinson et al. |

(Continued)

OTHER PUBLICATIONS

Anthony Vetro, et al."Coding Approaches for End-to-End 3D TV Systems," Mitsubishi Electric Research Laboratories, Cambridge, MA, http://people.csail.mit.educ/wojciech/pubs/3dtvcoding.pdf (Mar. 2, 2005).

*Primary Examiner*—John L Goff
*Assistant Examiner*—Daniel McNally
(74) *Attorney, Agent, or Firm*—Marsh Fischmann & Breyfogle LLP; Kent A. Lembke

(57) ABSTRACT

A method for fabricating a device for displaying an interlaced image. The method includes providing a film of transparent material and creating a lens array in the film by forming parallel lens sets on a first side of the film, and then bonding an interlaced image including sets of elongate image elements to a second side of the film. Each of the lens sets is configured with lenses for focusing light from one of the image elements in a particular paired set of image elements rather than all the elements as with lenticular material. The bonding of the interlaced image to the film may include printing the interlaced image directly onto the second side with the printing facilitated by the small lens array thickness. Lens array creating includes embossing the lens sets into the film with a flat die or cylinder/roller engraved with a reverse image of the lens array.

30 Claims, 8 Drawing Sheets

U.S. PATENT DOCUMENTS

| | | | |
|---|---|---|---|
| 5,695,346 | A | 12/1997 | Seikiguchi et al. |
| 5,731,883 | A | 3/1998 | Morton |
| 5,731,899 | A | 3/1998 | Meyers |
| 5,835,194 | A | 11/1998 | Morton |
| 5,842,762 | A | 12/1998 | Clarke |
| 5,924,870 | A * | 7/1999 | Brosh et al. ................. 434/365 |
| 5,933,228 | A | 8/1999 | Taylor et al. |
| 5,959,718 | A | 9/1999 | Morton |
| 5,967,032 | A | 10/1999 | Bravesec et al. |
| 6,091,479 | A | 7/2000 | Frosig et al. |
| 6,177,953 | B1 | 1/2001 | Vachette et al. |
| 6,224,214 | B1 | 5/2001 | Martin et al. |
| 6,256,149 | B1 | 7/2001 | Rolfe |
| 6,325,880 | B1 * | 12/2001 | Yamashita et al. .......... 156/209 |
| 6,424,467 | B1 * | 7/2002 | Goggins ..................... 359/626 |
| 6,481,849 | B2 | 11/2002 | Martin et al. |
| 6,490,093 | B2 | 12/2002 | Guest |
| 6,624,946 | B2 * | 9/2003 | Franko, Sr. ................. 359/619 |
| 6,781,761 | B2 | 8/2004 | Raymond |
| 6,795,250 | B2 | 9/2004 | Johnson et al. |
| 6,831,787 | B1 | 12/2004 | Scarbrough et al. |
| 6,859,240 | B1 | 2/2005 | Brown et al. |
| 6,943,953 | B2 | 9/2005 | Raymond |
| 6,984,425 | B2 | 1/2006 | Raymond |
| 6,995,913 | B2 | 2/2006 | Goggins |
| 7,002,748 | B1 | 2/2006 | Conley et al. |
| 7,016,116 | B2 | 3/2006 | Dolgoff |
| 7,019,865 | B2 | 3/2006 | Nims et al. |
| 7,038,854 | B2 | 5/2006 | Raymond |
| 7,046,271 | B2 | 5/2006 | Doerfel et al. |
| 7,057,823 | B1 | 6/2006 | Raymond |
| 7,075,725 | B2 | 7/2006 | Tomczyk |
| 7,083,340 | B2 | 8/2006 | Goggins |
| 7,149,035 | B2 | 12/2006 | Goggins |
| 7,151,541 | B2 | 12/2006 | Seder |
| 7,153,047 | B2 | 12/2006 | Goggins |
| 7,164,537 | B2 | 1/2007 | Raymond |
| 7,307,790 | B1 | 12/2007 | Raymond et al. |
| 7,359,120 | B1 * | 4/2008 | Raymond et al. ........... 359/626 |
| 2002/0021832 | A1 | 2/2002 | Dawson |
| 2002/0135177 | A1 | 9/2002 | Welch |
| 2003/0103351 | A1 | 6/2003 | Privas |
| 2004/0043203 | A1 | 3/2004 | Bogdanovic |
| 2004/0263885 | A1 | 12/2004 | Tomczyk |
| 2005/0135798 | A1 | 6/2005 | Szajewski |
| 2005/0180006 | A1 | 8/2005 | Mendoza |
| 2005/0286134 | A1 | 12/2005 | Goggins |
| 2006/0052152 | A1 | 3/2006 | Tedson |
| 2006/0082877 | A1 | 4/2006 | Wang |
| 2006/0146410 | A1 | 7/2006 | Krause |

* cited by examiner

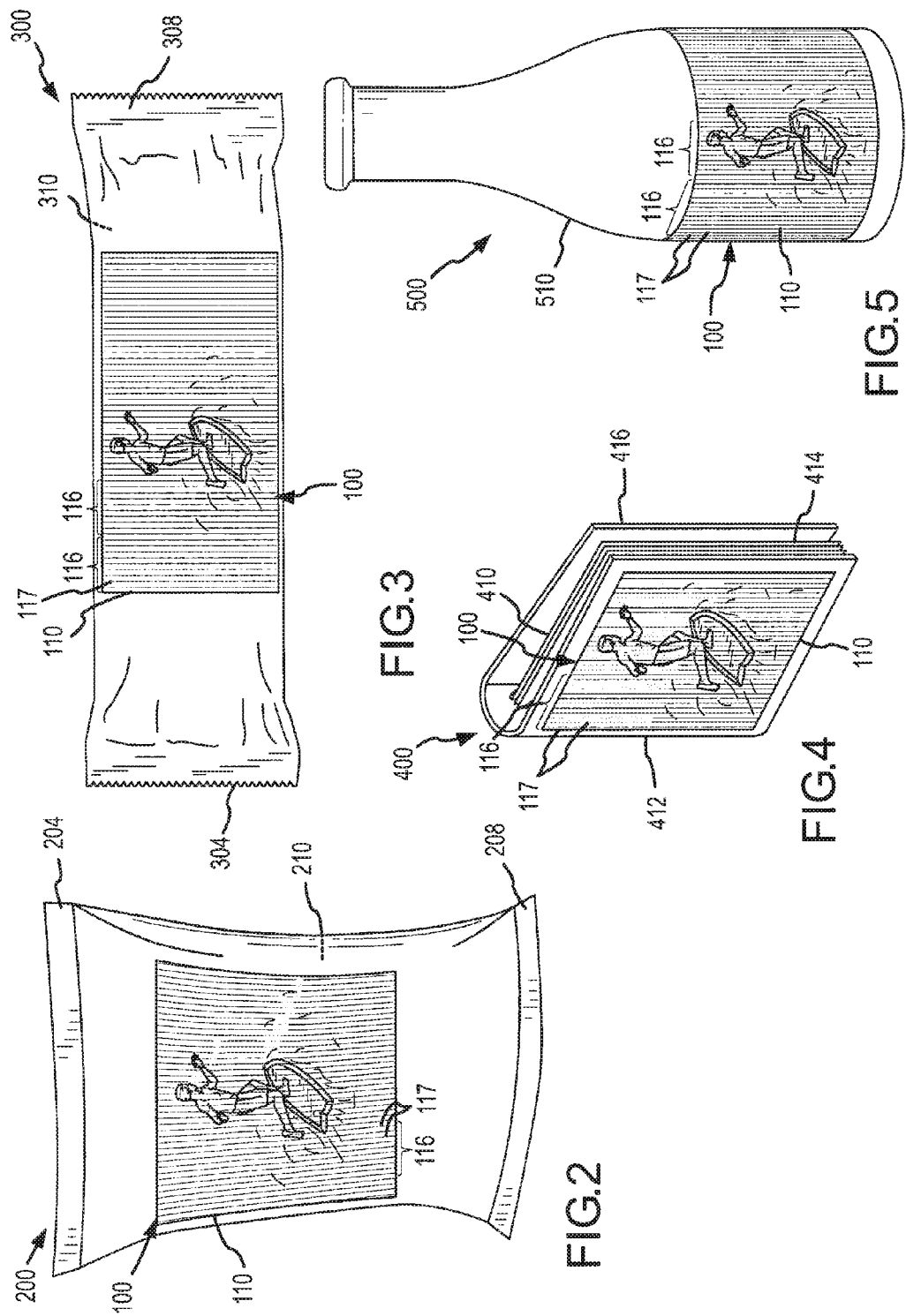

MANUFACTURE OF DISPLAY DEVICES WITH ULTRATHIN LENS ARRAYS FOR VIEWING INTERLACED IMAGES

CROSS-REFERENCE TO RELATED APPLICATIONS

This application is a continuation of U.S. application Ser. No. 11/558,541, filed Nov. 10, 2006, now U.S. Pat. No. 7,359,120, which is incorporated herein by reference in its entirety.

BACKGROUND OF THE INVENTION

1. Field of the Invention

The present invention relates, in general, to lens arrays and devices for use in viewing or displaying images that are interlaced to display animated, three-dimensional (3D), and other images, and, more particularly, to very thin lens arrays, as well as products incorporating such lens arrays and methods of fabricating such lens arrays, that include numerous, repeating sets of lenses or lens microstructures that are specially configured for viewing an interlaced image by pairing each lens in the set or microstructure with only one of (or a smaller subset of) the interlaced image elements or slices.

2. Relevant Background

Elaborate graphics can be produced with lenticular graphic labels to provide three-dimensional (3D) and animated imagery such as a short clip of a movie. For example, lenticular lens material is used in the packaging industry for creating promotional material with appealing graphics and typically involves producing a sheet of lenticular lens material and adhesively attaching the lenticular lens material to a separately produced object for display. The production of lenticular lenses is well known and described in detail in a number of U.S. patents, including U.S. Pat. No. 5,967,032 to Bravenec et al. and U.S. Pat. No. 6,781,761 to Raymond.

In general, the production process includes selecting segments from visual images to create a desired visual effect, slicing each segment into a predefined number of slices or elements (such as 10 to 30 or more slices per segment), and interlacing the segments and their slices (i.e., planning the layout of the numerous images). Lenticular lenses or lens sheets are then mapped to the interlaced or planned segments, and the lenticular lenses are fabricated according to this mapping. The lenticular lenses generally include a transparent web that has a flat side or layer and a side with optical ridges and grooves formed by linear or elongated lenticules (i.e., lenses) arranged side-by-side with the lenticules or optical ridges extending parallel to each other over the length of the transparent web. To provide the unique visual effects, ink (e.g., four color ink) is applied to or printed directly on the flat side of the transparent web to form a thin ink layer, which is then viewable through the transparent web of optical ridges.

Each lenticule or lens of the lenticular layer is paired or mapped to a fairly large set or number of the interlaced image slices or elements. For example, one lenticule may be paired with 10 to 30 or more interlaced image slices or elements associated with the image segments, and generally only one of the slices is visible through the lenticule at a time based on the position of the lenticule relative to a viewer's eye. In other words, the animation, 3D, or other graphic effect is achieved by moving the lenticule or the viewer's position to sequentially view each of the interlaced image slices under the lenticule and allow a viewer to see each segment of the image by combining the slices viewed from all the lenticules.

In producing conventional lenticular lens material, it is desirable to use as little material as possible, i.e., to produce effective lenticules or lenticular lens arrays with as thin as web material as possible. Decreasing lens thickness is also desirable such to facilitate fabrication using techniques such as web printing that are very difficult or impractical with thicker lens materials. Yhin lenticular lens material is desired to save on material costs and to provide a relatively flexible lens material or substrate that can be easily applied to products and product containers, such as in a label that can be attached to a box or to a bottle as part of a wraparound label or on a cup to provide desirable visual effects. To make lenticular lens materials thinner, the whole structure must be properly scaled downward together. In other words, the lenticules and the printed interlaced image must be shrunk or made smaller together to allow proper mapping of the image slices to the lenticules.

However, such shrinking of the lenticules has proven very difficult with limitations associated with printing the interlaced images often preventing the lens layer or web being made very thin. As noted above, all the interlaced slices for each segment are placed underneath a single lenticule such that numerous slices have to be printed with very little width to be mapped to the lenticules width or pitch. However, the printing can presently only be done with a limited degree of resolution, and this forces the lenticular lens material due to printing practicalities and resolution to be provided in coarser frequencies ranging from about 10 lenticules per inch (LPI) to about 200 LPI. With coarser lens arrays (i.e., with lower the frequency or LPI), the printing can be accomplished more easily and mapping to lenticules of the image slices achieved more accurately. However, coarser lens arrays with frequencies of 10 to 30 LPI tend to be very thick because general physics or optical rules for focusing with conventional lenticular material require that more lens thickness or more lens material be provided to achieve effective focusing. For example, a 15 LPI lenticular lens array with a fairly common viewing angle (such as a 22-degree viewing angle) may be mapped to an interlaced image that printed or provided directly behind the lenticular lens array, with each of the lenticules in the lens array being mapped to or paired with all image slices of a paired segment of the interlaced image. If the lens array is formed from acrylic, the lens array would need to be about ⅜-inch thick to enable the lenticules to properly focus on the paired image slices. Conversely, the frequency of the lenticular lens array may be increased (i.e., a finer lens array may be used). However, existing limitations on printing have resulted in the thinnest lenticular lens arrays being at least about 15 to 30 mils thick, and the mapping accuracy required at these lower thicknesses and high lenticule frequencies often results in lower quality imaging results and increased fabrication or printing costs.

There remains a need for a lens array or structure that provides an alternative to conventional lenticular lens arrays such that lens arrays or structures can be provided with less thickness and with enhanced mapping of interlaced image slices or elements to the lens array for improved visual effects. Preferably, such a new lens array would be easy and inexpensive to fabricate, would be well suited for fabrication with thicknesses less than presently achievable with lenticular lens materials (e.g., less than about 15 to 20 mils), and would still be useful for providing desired viewing angles (e.g., 20 to 40 degree viewing angles or the like) to view conventional interlaced images (e.g., images interlaced as for use with conventional lenticular material to achieve 3D, animation, or other visual effects).

SUMMARY OF THE INVENTION

The present invention addresses the above problems by providing ways to manufacture lens substrates or arrays formed with numerous lens microstructures or lens sets. Each of these lens microstructures can be used to provide the functionality of a much thicker lenticule or lens of conventional lenticular material as each of the lens microstructures is paired to a set of interlaced image elements or slices, which may be printed digitally, printed with offset printing, printed using web printing, or the like. The lenses of the lens microstructure are each used to focus onto or from a small subset of the slices in a paired set rather than focusing on all of the slices of the set as is required of a lenticule in conventional lenticular technology. Further, the lenses of the lens set or microstructure are each uniquely configured (e.g., with a differing cross sectional shape) to provide its own main viewing direction or focus line/direction such that each lens in a lens microstructure displays the small subset of images (e.g., 1 to 3 images) to which it is mapped and with a lens-specific viewing angle or angular distribution. In practice, the lens microstructures have an overall viewing angle that is generally the combination of the angular distribution of each lens of the lens microstructure with the focus lines or directions of each lens selected such that only select ones of the image elements or slices are displayed or visible as a viewer's line of sight moves through the overall viewing angle. The lens arrays may be significantly thinner than possible or practical with convention lenticular material (e.g., 50 to 90 percent or more reduction in lens thickness), which allows the "paper thin" arrays to be applied to or provided integrally in numerous product surfaces such as in printed labels, attached decals or labels, book jackets, magazine covers, wraparound labels, and many other print and packaging applications.

An ongoing problem with traditional lenticular lens material used to focus on and magnify printed interlaced images is that the lens arrays or material had to be relatively thick to be effective. Lenticular arrays need to be manufactured to follow optical laws or laws of physics such as Snell's Law such that the focus of these lenticules is determined by the radius of the lens and index of refraction of the lenticular material combined with other parameters including frequency and array thickness. A general problem with lenticular arrays is that in order to decrease the thickness of the lens or associated array thickness to lower costs and to enhance its application (e.g., thick plastic lens material does not process well, is difficult or impossible to bend, and is hard to wrap on curved surfaces), the frequency of the lenticules in the array must be increased (e.g., the lenticules per inch or LPI must be increased). As the frequency is increased, the thickness of the lens or lens array may be decreased, but, unfortunately, the quality of the displayed image or visual effect generally also decreases. More specifically, as the lenticule frequency is increased and the thickness is decreased, the ability to print high quality interlaced images to produce 3D and animation becomes exponentially more difficult because the slices or image elements have to be provided, at very fine widths, i.e., at high frequencies. For example, if it were desired to use a 12-mil thick lenticular lens array, the lenticules would have to be provided at a very high frequency (such as about 167 LPI) to produce a quality display and the image elements may need to provide sets of twelve images under each lenticule. As can be appreciated, printing an interlaced image for such a lens array becomes quite difficult and cannot be done with some printing techniques such as roll form as the image elements have widths of 0.000139 inches (1/167-inch divided by 12), which is impractical for most printing applications particularly a CMYK format in which all colors must register accurately in this small space or slice width.

With lens arrays using the lens microstructures or lens sets of the invention, the lens microstructures can be configured so as to provide the function provided by a thick conventional lenticule by using a number of thin lenses that are individually configured to focus on a subset of image slices (such as 1 to 3 slices rather than a whole set of 4 to 12 or more slices). The lens arrays can be imprinted with the lens microstructures on a thin film at a very high rate of speed. In one example, a high quality image display assembly is achieved with a 3-mil thick lens array having lens sets or microstructures on one side provided at 40 lens sets per inch (LPI) and an interlaced image on the other side. The interlaced image can be printed rapidly such as at up to 2,000 feet per minute or faster on a web press or similar device. To achieve a similar display capability with a conventional lenticular lens array may require a frequency of 40 LPI and a thickness of about 80 mils or more. From these few example, it can be seen that the use of lens microstructures to generate a lens array provides a significant decrease in material costs, allows very thin lens arrays or substrates to be used in numerous applications for which conventional lenticular material is not practical, and greatly simplifies manufacturing by, for example, allowing printing of interlaced images at lower frequency or fineness.

More particularly, a lens microstructure is provided for use in lens arrays for displaying interlaced images. The lens microstructure includes a substrate or layer of material that is transparent or at least translucent to light. The structure further includes a linear or elongated center lens on a lens side of the substrate. First and second sets of linear or elongated side lenses are positioned adjacent the center lens to extend parallel to the center lens. Each of the lenses is configured to provide a differing or unique focus direction or focus line such that the lens microstructure has an overall viewing angle that is a combination of an angular distribution of the center lens and angular distributions from each of the side lenses (e.g., the focus of the structure steps out from the center lens with each side lens). In some embodiments, each of the angular distributions differs but in some cases the angular distributions are substantially equivalent across the lens microstructure (such as a value from the range of about 1 to 10 degrees). In some embodiments, an odd number of lenses are provided in the lens microstructure with an equal number provided in each, side set, and further, the cross sectional shape of the first side set is preferably a mirror or reverse image of the second side set. The thickness of the substrate may vary, e.g., with each successive lens from the center lenses being slightly thicker, or the thickness of the substrate as measured at the peak or thickest part of each lens may be kept substantially constant such as less than 15 mils and in some cases 10 to 3 mils or less. The lens microstructure is configured for focusing on one set of slices in the interlaced image such as a segment set and each of the lenses preferably focuses on a small subset such as 1 to 3 slices that may generally be positioned beneath or adjacent the corresponding lens. Lens arrays can readily be formed that include two or more of such lens microstructures to display an interlaced image, and numerous products that include such lens arrays and paired interlaced images may be fabricated to practice the invention.

According to another aspect, an assembly is provided for displaying an interlaced image. The assembly includes an interlaced image, which may be digitally printed, web printed, or the like, with sets of elongate image elements or slices A lens arrays is provided with a first side proximate the interlaced image such as a planar surface and a second side distal the image with a plurality of lens sets. Each of the lens sets is paired with one of the sets of the image elements and includes a number of linear or elongate lenses that are each mapped to a subset of the image elements in a corresponding one of the paired sets. Generally, each of the lenses is configured with a cross sectional shape that allows the lens to focus light from the subset of image elements (e.g., from one of the image elements). Each of the lenses may be configured to provide a lens-specific viewing angle with a particular focus line, and in some preferred embodiments, the focus lines to the paired image element subset is chosen to differ from other lenses (e.g., each lens has a unique focus direction such that the viewing angles are additive to provide an overall viewing angle for the lens set). The interlace image may be printed directly onto the first side of the lens array (with or without a primer first being applied) or an adhesive layer may be used to attach a separate substrate or sheet with the image to the first side of the lens array. In some cases, each of the lens sets includes an odd number of lenses (e.g., 5 to 21 or more lenses), and the lens sets may be provided at a frequency in the lens array from 5 to 75 lens sets per inch with a typical embodiment using a frequency of 10 to 30 lens sets per inch, with the particular frequency being selected to suit the interlaced image being displayed. An even number of lenses could be used to practice the invention. In this case, the sublenticules or lens on either side of a center line of the lens set could have distribution angles of plus/minus 2 degrees for example, but, it will be understood that this example does not need to be explained in detail as it is nearly equivalent to the case of a lens or sublenticule provided on such a center line of a lens set.

According to another aspect, an image display apparatus is provided that includes an interlaced image made up of a plurality of image elements each having a particular or predefined width. A lens substrate is provided in the display apparatus with a planar side positioned proximate to the interlaced image (e.g., the image may be printed to the planar side or attached with a transparent adhesive). The lens substrate includes a lens side distal to or opposite the planar side. The lens side includes numerous lens microstructures that are each made up of a plurality of lenses. Each of these lenses is paired or mapped to one of the image elements so as to focus light passing through the lens substrate to a width of about the width one of the image elements and to direct the light onto the paired one of the image elements (e.g. each lens in a lens microstructures is used to display one of the image elements in the interlaced image rather than a larger set of such image elements). The image elements are grouped into segment sets including a number of the image elements, and the lens microstructures each have the same cross sectional shape that defines the shape of each lens in the microstructure, with the cross sectional shape chosen to map each lens with one of the image elements. In some embodiments, an odd number of lenses are provided in each of the lens structures such as by providing a center lens with a particular focusing direction (e.g., perpendicular to the planar side of the lens substrate) and side lenses extending from both sides of the center lens. The center and side lenses each have unique or distinct focusing direction or focal lines that are selected such that the angular distributions of all the lenses are generally additive or combinable to define an overall viewing angle (e.g., 20 to 45 degrees or another useful viewing angle for displaying interlaced images) for the lens microstructure.

In one embodiment, a method is provided for fabricating an assembly for displaying an interlaced image. The method includes providing a film of material that is at least translucent to light, such as providing a roll or sheet of a substantially clear plastic. The method continues with creating a lens array in the film by forming parallel lens sets on a first side of the film, and then bonding an interlaced image including sets of elongate image elements to a second side of the film. Each of the lens sets may be configured as discussed in the preceding paragraphs with a set of lenses for focusing light from a subset of the image elements in a particular mapped or paired set of image elements. The bonding of the interlaced image to the film may include printing the interlaced image directly onto the second side such as using web printing at a rate of up to 2,000 feet per minute or greater, with the printing facilitated by the very thin nature of the lens array that may have a thickness of less than 15 mils such as 1 to 5 mils or the like. Alternatively, the bonding may include bonding with a layer of substantially transparent adhesive interposed between the second side of the film and the interlaced image (e.g., by using a thermally activated adhesive provided on the second side of the film in a thermal lamination process that may include the use of nip rollers or otherwise pressing the film and the interlaced image and/or a substrate holding the image together). The creating of the lens array may include embossing of the lens sets into the first side of the film with a flat die or cylinder/roller engraved with a reverse image of the lens array such as after the film is heated or with a heated roller or with cold embossing die or roller. The creating may also include coating the first side of the film with a clear coating that is then embossed (e.g., a UV-curable coating or a softer material layer that is more susceptible to embossing). The bonded combination may then be attached to a packaging surface such as wrapper, label, decal, cover, or the like to allow easy use of the combination in a display device or the devices (such as cards, posters, or the like) may simply be cut out in final form (or for additional processing such as applying magnetic strips or additional layers or further printing such as on the back side of a image substrate).

BRIEF DESCRIPTION OF THE DRAWINGS

FIGS. 2-5 illustrate representative products that are shown to include the image display assembly of FIG. 1A or FIG. 1B as a label/decal or more integral part of a product sidewall;

DETAILED DESCRIPTION OF THE PREFERRED EMBODIMENTS

Figure 1A:
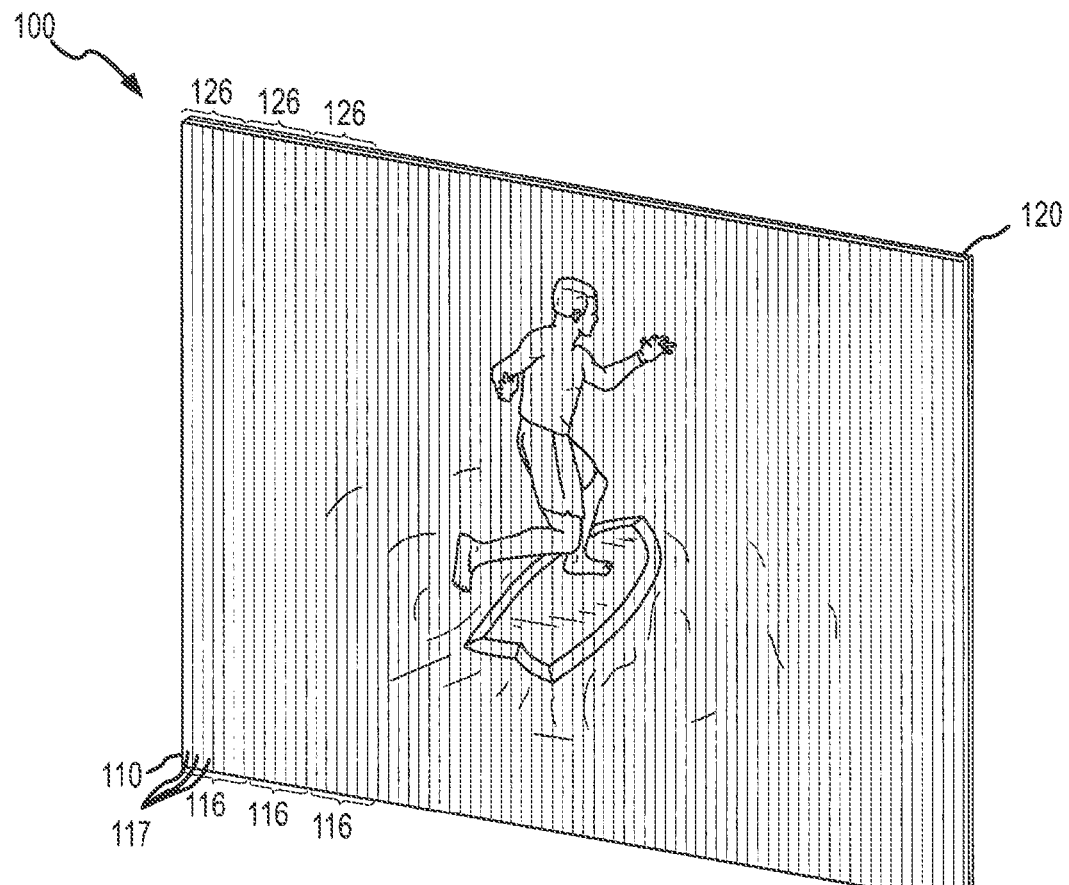
FIG. 1A is a perspective view of an image display assembly or apparatus such as a label, decal, or the like that may be applied to another structure or used as a standalone device, with the imagery assembly including a lens array and an interlaced image according to the present invention.

Briefly, the present invention is directed to lens arrays that can be used to reduce or even replace the use of conventional lenticular material. With conventional lenticular material, numerous elongated or linear lenticules or lenses are provided in a clear or translucent web or layer. Beach lenticule is used to provide a viewing angle (e.g., 15 to 40 degrees or the like and more typically about 20 to 35 degrees) through which a plurality of interlaced slices of an image segment are visible to a viewer. For example, an interlaced image may be printed on the smooth side of the lenticular material web with the set of slices, which may number 5 to 20 or more, for a segment of the image being mapped to a particular lenticule such that the slices can be viewed separately as the material or the viewer's line of sight is moved across the viewing angle. The interlaced image with its interlaced image slices or elements can in this way be viewed to achieve visual effects such as 3D, animation, and the like. A significant problem with conventional lenticular material is that the lenticule (or the lenticular material) must be relatively thick to effectively focus onto the numerous image slices paired with the lenticule. For example, the thinnest conventional lenticular material used today is at least about 15 mils but the printing and mapping requirements generally have lead the printing and packaging industry to use lenticular material or lenticules that are at least about 20 mils thick.

In contrast, the lens arrays of the present invention can be thought of as replacing each of these conventional lenticules with a lens set or lens microstructure. The lens set is configured with a number of lenses or "sublenticules" that are each paired with a smaller subset of slices of a segment. For example, a conventional lenticule may be used to provide a viewing angle to selectively view 15 image slices of a segment of an interlaced image. A lens set or lens microstructure of a lens array of the invention would, instead, use 15 lenses or sublenticules that are each mapped or paired with one of the image slices instead of to all 15 image slices or elements. Each of the lenses of the lens set configured to provide a "step" or portion of the viewing angle, e.g., if the viewing angle is 30 degrees in the 15 lens example each lens would provide a step of about 2 degrees such that the lens set provided the same or similar viewing angle as a conventional lenticule. However, the thickness of the lens set can be significantly less than that of a conventional lenticule to provide the same or similar effect. For example, it is likely that lens arrays may be effective with thicknesses of less than about 15 mils and even less than about 3 mils (while, of course, lens assemblies with thicknesses greater than 15 mils may be used in some applications).

The lens arrays of the present invention would include a number of the lens sets or lens microstructures similar in number to the lenticules of lenticular material, and the lens sets may be defined by frequency similar to lenticules at a particular LPI (e.g., lens sets per inch or lenticules per inch) and the overall pitch of the lens set or lens microstructure is often the same or similar to the pitch of the lenticule it is used to replace. An interlaced image may be produced for a conventional lenticular material such as for a 20 LPI lenticular lens material, and the lens sets may be provided in a lens array with 20 lens sets per inch or at 20 LPI. The lens arrays produced according to the invention are typically paired with an interlaced image that may be printed onto the smooth side of the lens array (which may be formed from plastic, glass, or other transparent to translucent material) or may be applied to the back or smooth side of the lens array with an adhesive (e.g., with the printed interlace image provided on a substrate such as plastic, paper, or the like). The combination of the interlaced image and the lens array forms an image display assembly, device, or product of the invention that produces high quality 3D, animation, and other visual effects but with 50 to 90 percent or more reductions in thickness (i.e., with ultrathin lens arrays).

FIG. 1A illustrates an exemplary an interlaced image display assembly 100 of the present invention. The assembly 100 may take the form of a label, a decal, a poster, a billboard, a book cover, media insert, printing, or label (e.g., for CDs, DVDs, software, or other media product), a card (e.g., a debit, credit, smart, security, or other card) or nearly any product or device that is used to display images. The assembly 100 is shown to include a lens array 110 that is mated with an interlaced image 120 such as by the interlaced image 120 being printed onto a smooth or back surface of the assembly 110 distal or opposite the lens surface of the array 110. The lens "array" 110 of the invention is intended to be construed broadly to be a layer/sheet or layers/sheets of a material such as plastic, glass, ceramic, or other transparent to translucent material along with a lens surface formed on one side and a smooth or textured side opposite the lens surface.

The lens array 110 includes a number of lens sets or lens microstructures 116 that extend across one of the surfaces of the lens array 110 (or may be provided in a select portion). The lens sets 116 illustrated each include a number or plurality of linear or elongated lenses or lens elements 117. The lenses 117 and useful configuration for the lens sets or microstructures 116 are explained in more detail with reference to FIGS. 6-12. The interlaced image 120 is preferably printed onto or applied to the lens array 110 such that its sets of image slices 126 are mapped or paired to the lens sets 116, e.g., with 1 to 3 or more of the slices being positioned underneath or opposite one of the linear lenses 117. Note, the width of the lenses 117 and image slices 126 is shown to be much larger (or not to scale) in FIG. 1A as the lenses 117 often will be less than 100 microns and more typically less than about 50 microns. As explained further below, each of the lenses 117 in the lens sets 116 focuses a viewer's line of sight onto the paired subset of slices from the full set of slices 126 from an image segment (i.e., not on all slices in the set 126), and such focusing will combine with the other lenses 117 of the lens set 116 to provide a predefined viewing angle for viewing the set of image slices 126 (e.g., 15 to 45 degrees or another useful viewing angle).

Rather than printing directly on the lens array 110, it may be desirable to form image display assemblies by applying an interlaced image on a substrate or with a plastic, paper, or other backer or liner onto the lens array 110. FIG. 11B illustrates such an image display assembly 150 of the present invention. In the assembly 150, the lens array 110, which is configured with lens sets 116, is bonded to a substrate 158 such as a paper, plastic, or the like sheet. The bonding is achieved with an adhesive 154 that may be applied to either the lens array 110 or to the substrate 158. For example, thermal laminating processes may be used to form the assembly 150 with the adhesive 154 being a layer of thermally activated adhesive applied to either the lens array 110 or more commonly to the substrate 158. The adhesive 154 is activated by heat and the array 110 and substrate 158 are mated together with pressure such as that applied by a convention nip roller or the other pressure-applying machinery. The interlaced image 120 is applied or printed onto the substrate 158 prior to the bonding process and the bonding is performed to carefully map or pair the sets of image slices or interlaces with the lens sets 116 and the lenses 117 in each set 116. The assembly 150 may be a standalone product such as a smart or credit/debit card or may be applied to another structure as a label, cover, decal, or the like.

FIGS. 2-5 provide additional examples of products in which the image display assemblies 100 (or 150) may be used to practice the invention. FIG. 2 illustrates the use of the display assembly 100 provided on a sidewall 210 of a package 200 between sealed ends 204, 208. For example, the package 200 may be a foil snack bag or a plastic or paper bag used to package food, retail products, or the like. The assembly 100 may be applied as a decal or label to the sidewall 210 or be provided as an integral portion of the sidewall 210. FIG. 3 illustrates a similar packaging 300 for a retail product such as a food product. A display assembly 100 is applied to or provided as an integral portion of the sidewall 310 between sealed ends 304, 308, and the sidewall 310 may be formed of a metallic foil, plastic, paper, or the like as is commonly used in the packaging industry. FIG. 4 illustrates a book, notebook, magazine, or the like 400 with pages 410 enclosed or bound to cover 412 with front and back members 414, 416. The display device or assembly 100 with the lens array 110 and interlaced image is attached to the cover 412 on one or both members 414, 416 (e.g., front and back covers of a book, book jacket, magazine cover, notebook, or the like) or formed as part of the cover 412 (e.g., the lens array 110 may be provided as part of the process to form a notebook cover or book jacket or the like). FIG. 5 illustrates a container 500 (shown as a bottle but could be a can, jar, jug, or any other container) with a sidewall 510, and a lens assembly 100 is attached to the container sidewall 510 such that the interlaced image is visible through the lens array 110 with its lenses provided in lens sets or lens microstructures 116. As discussed below, the lens assemblies 110, 150 are often particularly useful in packaging or products such as those shown in FIGS. 1A-5 because the overall thickness can be controlled to provide viewing of an interlaced image with an ultrathin lens array 110 (e.g., less than about 15 mils and, in some embodiments, a thickness selected from the range of about 10 mils to about 3 mils or less).

Figure 6:
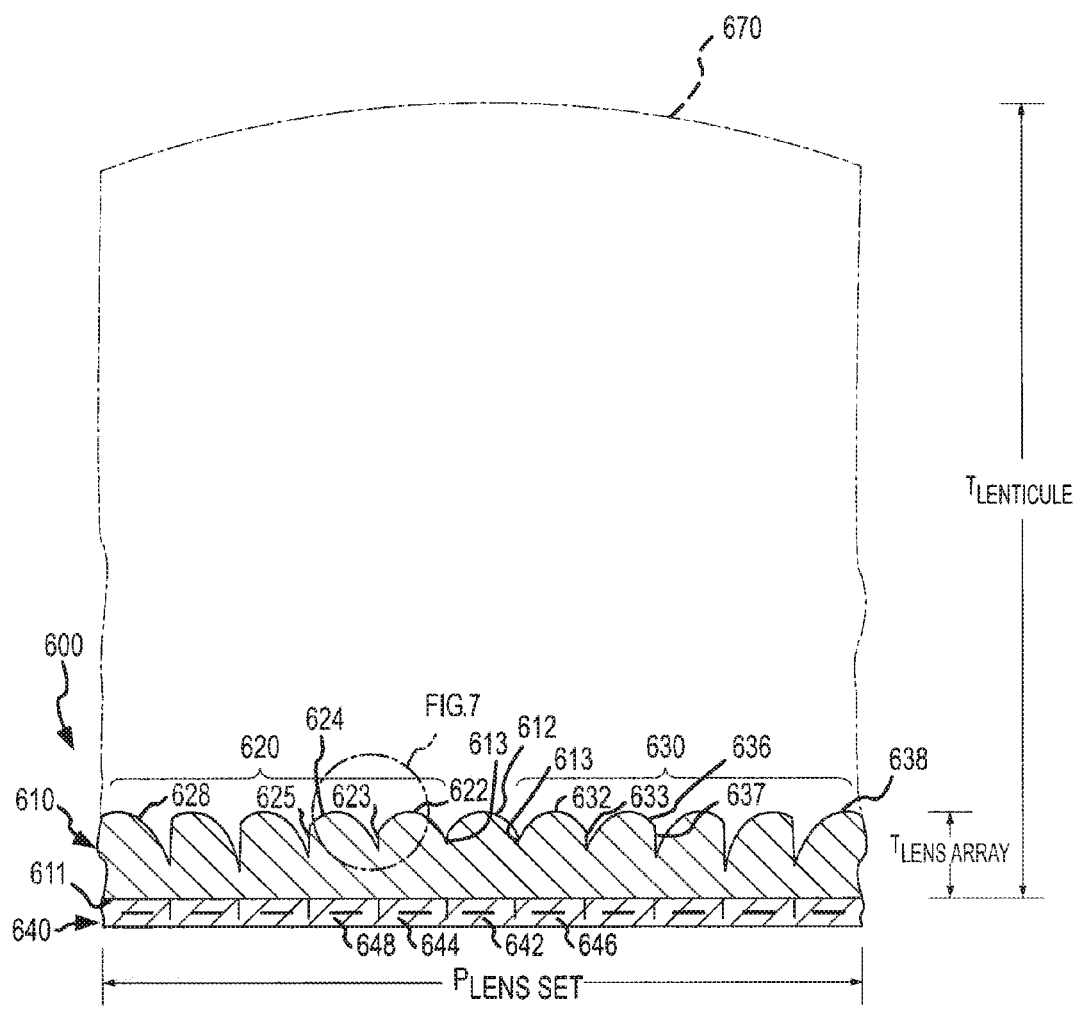
FIG. 6 illustrates a cross section of one embodiment of portion of in image display device showing a lens microstructure or lens set that may be used in a lens array provided in the image display device of the invention, with the illustrated embodiment using eleven lenses or micro lenses in the lens set or microstructure as a representative, but not limiting, example.

FIG. 6 illustrates a portion of an interlaced image display assembly 600 according to one embodiment of the invention. The "portion" of the assembly 600 is selected to provide the details or configuration of one exemplary lens microstructure or lens set 610. The assembly 600, as discussed with reference to FIG. 1A, would include a lens array with a plurality of such lens sets 610 that are provided in a side-by-side manner (e.g., with an edge lens of the lens set 610 abutting an edge lens of the next or adjacent lens set(s)). In prior art devices used to view an interlaced image, a lenticule 670 would be provided with a particular thickness, t and a pitch to focus upon a set of image slices or image elements provided in an interlaced image 640. In contrast, the invention addresses the limitations of such a lenticule 670 by providing a lens set 610 with a separate sublenticule or lens for each interlace or slice in the image 640. This results in a much reduced thickness, $t_{Lens\ Array}$, for the lens set 610 (and the lens array containing this and other lens sets that are typically configured identically to the lens set 610). The inventors have verified that the lens set or array thickness, $t_{Lens\ Array}$, may be 50 to 90 percent or less of the thickness, $t_{Lenticle}$, that would be provided for a conventional lenticule 670 that provides the same or similar function as the lens set 610 (although the particular thickness of the lens array 610 is not limiting of the breadth of the invention).

Figure 1B:
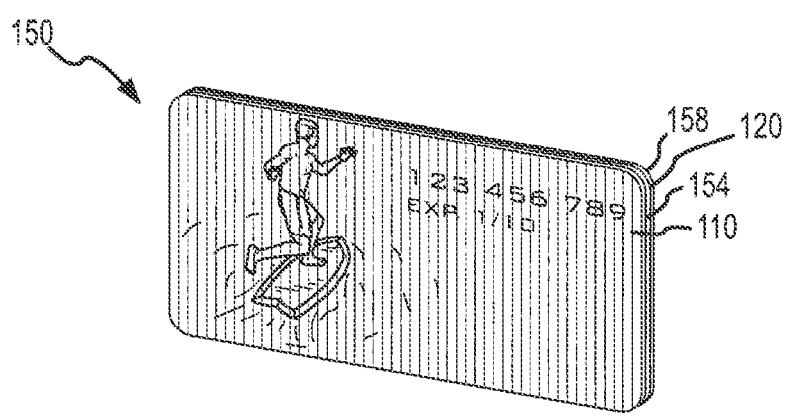
FIG. 1B is a perspective view of an image display assembly similar to FIG. 1A but further including an adhesive layer between the lens array and the interlaced image and a substrate upon which the image is printed or provided, with the adhesive layer being provided on either or both the lens array or the interlaced image.

As shown, the display assembly 600 includes a lens set or lens microstructure 610 with a first side or surface including lenses and a second side or surface 611 that may be smooth or textured and upon which a printed image 640, such as an interlaced image, is printed (or applied with an adhesive such as shown in FIG. 1B). Generally, the process of forming the assembly 600 includes using a high or even the highest practical resolution interlaced image 640 that can be printed and designing a lens for inclusion in the lens set 610 for each interlaced image slice or element (or in some cases for 1 to 3 or more slices rather than just one image element). Each lens of the lens set 610 is designed to send light from the paired slice underneath it or adjacent it precisely in a predefined or desired direction (e.g., designed to focus the light reflected from the slice to be directed in a step of a larger viewing angle defined for the lens set 610 or over a small viewing angle that differs but is adjacent or near to adjacent to the next or adjacent lens in the lens set (e.g., a subpart of the viewing angle of the lens set 610)). Such a configuration of the lens set 610 can be seen as a further improvement over a conventional lenticule 670 in that it allows individual adjustment or setting of the angular distribution from the interlaced pattern or image 640. A lens array made of lens sets 610 can be made thin enough to be used as a wrapping material or as thin as paper to be applied to another structure or provided alone whereas conventional lenticules 670 are generally too thick and have more limited uses. Hence, the cost of material for a lens array formed from a plurality of lens sets or lens microstructures 610 is a fraction of the material cost for lenticular material with lenticules 670, which allows the display assembly 600 to be used to meet the large market demand for labels and other thin packaging products that can be used to display interlaced images with motion, 3D, and flash imagery.

The lens set 610 is configured in the illustrated example to include an odd number of lenses (i.e., 11 in this example) with the number of lenses typically selected to match the number of slices of interlaced image 640 that are paired with the lens set 610 such as the number of interlaces provided for each image segment in the image 640. As shown, the lenses of lens set 610 may be thought of as divided into a center lens or lens element 612 and sets of side lenses 620, 630 (e.g., left and right lens sets). The left and right lens sets 620, 630 mirror each other in their configuration. For example, the lens 622 immediately adjacent the center lens 612 in the left lens set 620 is identical in cross sectional shape as the lens 632 immediately adjacent the center lens 612 in the right lens set 630 except that it is the mirror or reverse image.

The lens 612 is configured to focus on a paired slice 642 of the interlaced image 640 through a particular viewing angle, such as a fraction of an overall viewing angle selected for the lens set 610, and in a particular direction, such as when a viewer's line of sight is substantially perpendicular to the image 640 and lens set 610. The left lens set 620 and right lens set 630 each include one or more lenses that are used to view the interlaced image 640 when the line of sight is changed from perpendicular or near perpendicular. Each lens in the sets 620, 630 provides its own step or particular viewing angle that focuses light from interlaces or slices of the interlaced image that are paired with each lens (e.g., a subset of the interlaces such as one slice as shown in FIG. 6). For example, the lens set 610 may be configured to provide an overall viewing angle of about 33 degrees. Each of the lenses in the lens set 610 including the center lens 612 would then be adapted to provide viewing angle that is a fraction of this overall viewing angle. In one embodiment, the steps are substantially equal but in other embodiments, the steps may be differ for at least some of the lenses (e.g., one viewing angle for the center lens 612, one viewing angle or step for the next lens in both directions, one viewing angle or step for the second lens in both direction, and so on or the angles may be varied for only one or more of the lenses or lens pairs with the others using the same step value). In this 33-degree overall viewing angle example, each lens of the lens set 610 may provide an angular step/distribution or have its own viewing angle of about 3 degrees. Further, such angular step or distribution is arranged to have a differing direction than the adjacent lens such that each lens of the lens set provides its own unique viewing angle with a differing viewing direction. In this fashion, the interlaced image 640 is displayed through the lens set 610 with only one of the interlaces or slices being visible or displayed at a time or at a particular line of sight within the overall viewing angle. For example, the image element 642 under or paired with center lens 612 may be displayed at a first position of the assembly 600 or viewer and when the line of sight is changed the image element 644 may be displayed through lens 622 or the image element 646 may be third displayed through lens 632.

As discussed above, each of the lenses in the lens set or lens microstructure 610 may be configured individually to focus on a paired image element or slice and/or to direct reflected light from such slice or element in a particular direction and with a particular viewing angle. As shown in the example of FIG. 6, the lens set 610 includes a center lens 612 that is generally symmetric about its center line (or a plane passing through its center). The lenses 622, 632 adjacent and abutting the center lens 612 provide a next step or angular distribution relative to the viewing angle or angular distribution of the center lens 612. For example, the center lens 612 may have a viewing angle of 1 to 5 degrees or another value with its center substantially perpendicular to the image slice 642. Then, each of the lenses 622, 632 may provide a small angular step from this central viewing angle to provide two additional viewing angles or angular distributions for light from the image slices 644 and 646 that are positioned underneath or adjacent the lenses 622, 632. In other words, the viewing angle provided by the three lenses 612, 622, 632 may be 9 degrees with each providing a 3 degree step or subpart of the combined viewing angle, and within this combined viewing angle, only one of the slices 642, 644, or 646 may be visible at a time depending upon a viewer's line of sight (although in many cases there may at least some overlap such that portions of nearby slices may be visible when a dominant or main slice is viewed).

A next step is added or provided by the contribution of lenses 624 and 636 of the left and right side lens sets 620, 630. These lenses 624, 636 provide the same angular step as the lenses 622, 632 or, in some cases, a smaller or large step. In the above example, each of these lenses 624, 636 may provide another 3 degree step or angular distribution that is directed so as to be additive to the viewing angle provided by lenses 612, 622, 632 such that the overall viewing angle of these 5 lenses is 15 degrees with differing ones of the slices of interlaced image 640 being displayed or visible based on the light of sight (e.g., slice 648 is paired with lens 624 and is generally only visible when the display assembly 600 is positioned or the viewer moves to an angle that provides a line of sight falling within the 3-degree viewing angle of the lens 624). Such step increases or additions to the overall viewing angle provided by the lens set 610 are continued until outer side lenses 628 and 638 are included, and the assembly 600 is formed by providing additional lens sets configured similarly to lens set 610 to abut or contact the edge lenses 628, 638 (e.g., another lens configured similar to lenses 638, 628, respectively).

Figure 7:
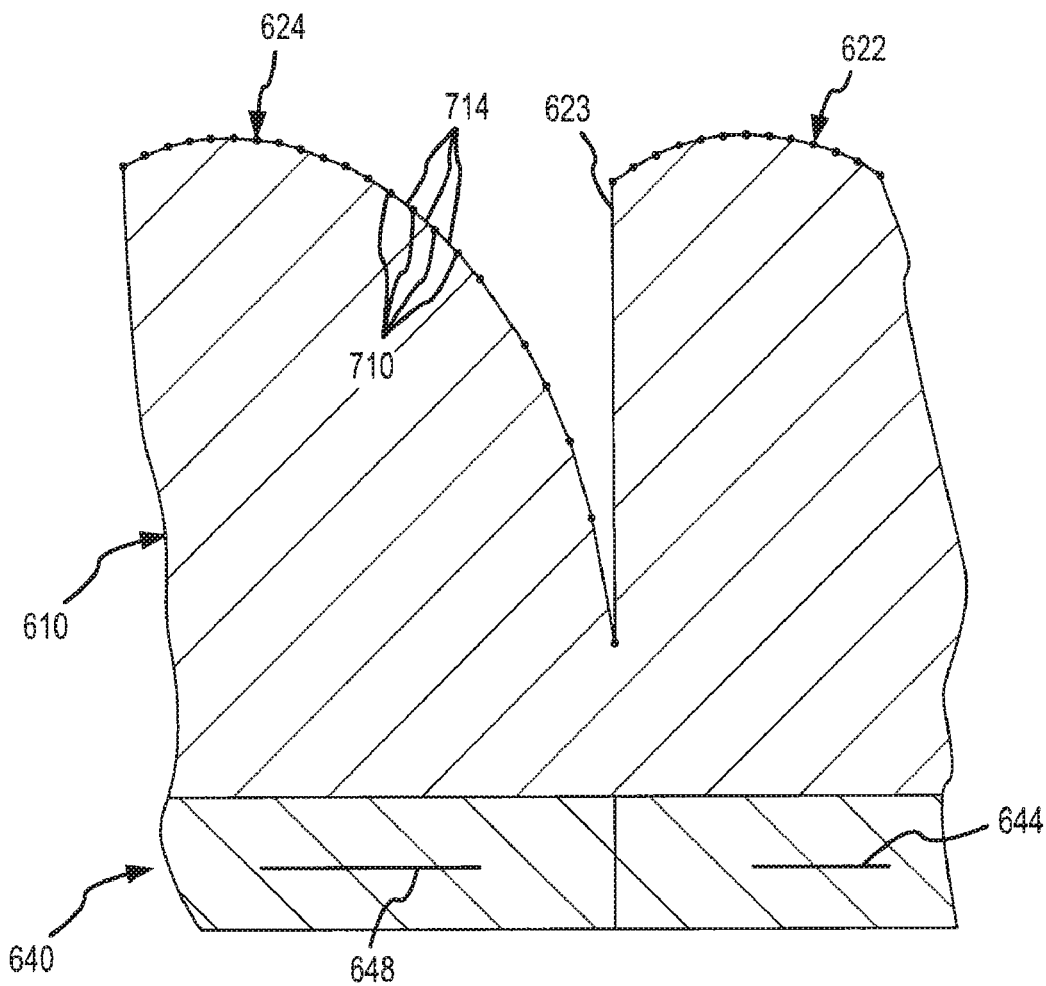
FIG. 7 illustrates an enlarged view of a portion of the image display device of FIG. 6 illustrating in more detail an adjacent pair of lenses or micro lenses of a lens set or microstructure showing a vertical side wall used to join and/or form side lenses of the lens array (with the center lens or micro lens typically being symmetric with a continuous curve in cross section)
Figure 8:
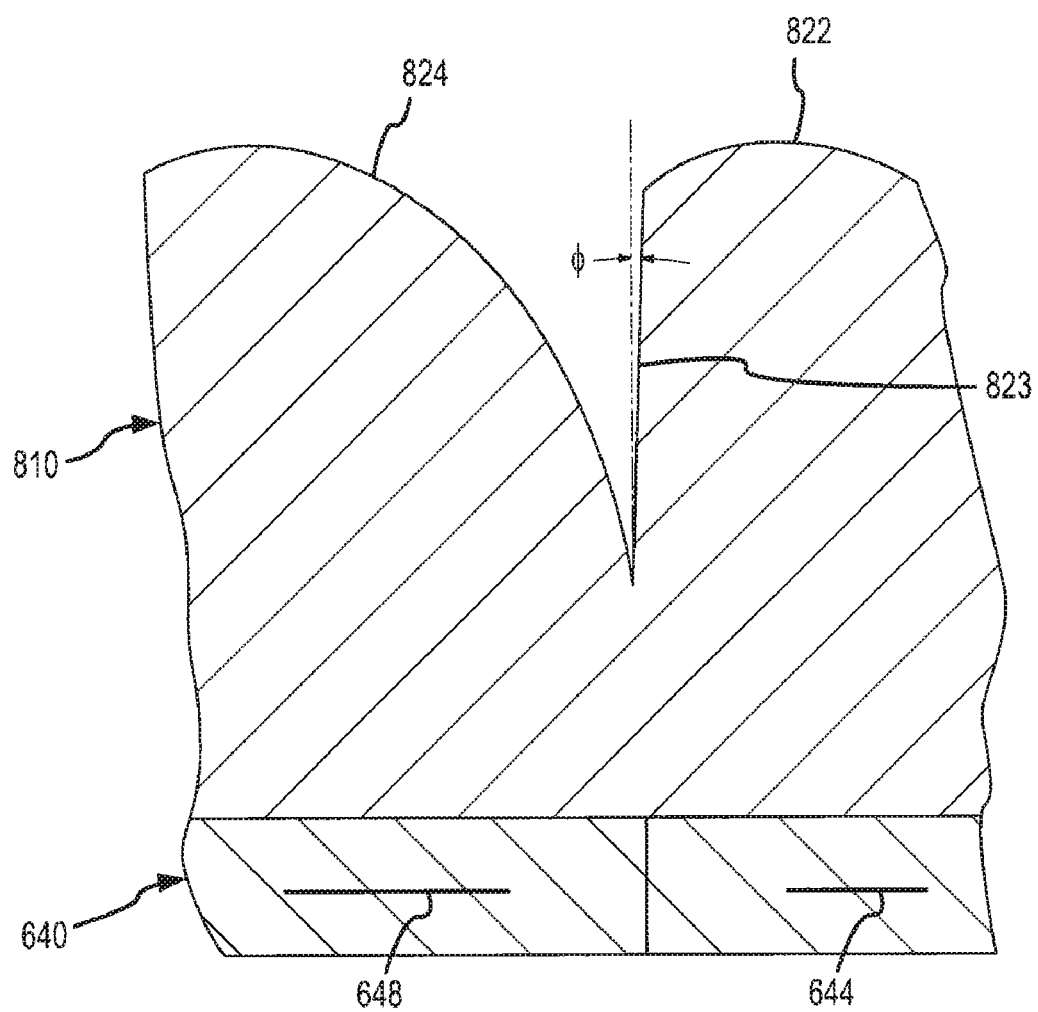
FIG. 8 illustrates an enlarged view of a portion of an image display device, such as the device of FIG. 6, similar to FIG. 7 but showing lenses or micro lenses with a side wall that is not vertical (i.e., off vertical by a relatively small angle to facilitate manufacture of the lens assembly with such lenses in its lens sets)

To maintain the thickness, $t_{Lens\ Array}$, of the lens set 610 at a particular thickness (e.g., less than 15 mils for example) each of the lenses in the side sets 620, 630 is provided with a vertical side edge as shown with edges 623, 625, 633, 637 for side lenses 622, 624, 632, 636. An exemplary vertical side edge 623 is shown in FIG. 7 for lens 622. The center lens 612 typically will also have side walls or edges 613 to maintain the overall thickness of the lens set but these side walls may be very small relative to the edges 623, 625, 633, 637 shown for the other lenses. The side edge 623 is typically vertical such that the edge 623 is substantially parallel to a plane passing through the center of center lens 612. FIG. 8, however, illustrates another embodiment of such side lenses that is configured to facilitate machining or manufacturing of the lens sets. In this example, a lens set 810 of a lens array or lens layer is shown to include a pair of side lenses 822, 824, and a side edge 823 is shown to join the lens 822 to the adjacent lens 824. The side edge 823 in this case is not vertical but is instead offset or off vertical by an offset angle, θ, that is chosen based on tool or mold design to facilitate manufacture (e.g., all easier removal or control binding of a cutting tool). For example, the offset angle, θ, as measured from a plane parallel to a plane passing through the center of the center lens 612 as shown may be about 1 to 5 degrees or larger and in one case is about 2 degrees.

Now, with reference to FIGS. 6 and 7, it may be useful to explain one useful design process for a constant thickness, $t_{Lens\ Array}$, microstructure such as lens set 610. Initially, an overall pitch, $P_{Lens\ Set}$, is selected for the lens set 610. A smaller pitch is generally preferable for obtaining a better image resolution. Next, the number of interlaced images or slices that will be displayed by the lens set 610 is chosen for an intended application, and in some embodiments, the number of slices of sets defines the number of lenses in the lens set 610 (e.g., with each lens being used to focus on a paired one of the image slices or image elements). Typically the number is selected to be an odd number when a one-to-one relation is used for the lenses and image slices, as this allows a single center lens to be used and combined with side sets of lenses having equal numbers of lenses (which can be mirror or reverse images of each other). The pitch and number of lenticules are used to determine the width of each lens in the lens set. When the lenses are substantially equal in width, the lens width is determined by the following equation: Width of Lens=Overall Pitch or $P_{Lens\ Set}$/Number of Lenses in Lens Set.

A thickness, $t_{Lens\ Array}$, is then selected such as less than about 15 mils or a greater thickness. In some embodiments, the lens array thickness, $t_{Lens\ Array}$, is selected so it is related to the width of the lenses of the lens set 610 such as to be a little larger or thicker than the width of each of the lenses (but, typically, much smaller than the thickness of a conventional lenticule, $t_{Lenticule}$, used to focus on the interlaced slices previously chosen for the lens set 610). The overall viewing angle is selected and the viewing angle or angular step or difference for each lens is chosen (such as by dividing the overall viewing angle by the number of lenses in the lens set 610), or the individual lens angular steps or distributions may be set and these steps may be combined to define the overall viewing angle for the lens set 610. The values of the viewing angles for each lens and its associated image slice can be individually selected in some embodiments, which is not possible with conventional lenticular structures.

To start the theoretical construction of a lens of the lens set, a ray is traced from each interlace or image element position on the printed substrate 640 associated with the lens set 610 being designed. An initial trace is made to the center of lens element under construction that has temporarily been set to the desired thickness, $t_{Lens\ Array}$. The slope of the lens element (e.g., of a segment of such lens element between two knots) at that point is adjusted to refract the ray in the desired angular direction for the lens element being generated, e.g., the center lens or lens element 612. Then, a small increment along the direction perpendicular to the lens set 610 axis is made in one direction (e.g., left or right), and the starting point of the next lens segment of the lens element or lens, is the ending point of the previous lens segment. The next or second segment of the lens element being constructed is connected to the end of the first segment and a slope is found for the next or second segment to refract a ray to desired direction (i.e., onto a particular location where an image slice is anticipated to be positioned). This process is repeated until a left or right boundary of the lens element is reached and the segment-by-segment is repeated for the segments between knots in the other direction (right or left) until the other boundary of the lens element or lens is reached. If a thickness overage occurs (e.g., over a preset overage limit to achieve a desired lens array thickness), this thickness overage may be subtracted and the process repeated to regenerate the lens element. After completion of this lens element a ray is sent from the next or adjacent interlaced image slice to the center of a new lens or lens element, e.g., through the center of lens 622 or 632 after completion of lens element 612. The slope of the segment of the next lens element is adjusted so as to send the traced ray in a desired angular direction (e.g., a step from the angular direction of the prior lens element such as a 3 degree or other angular step value from 90 degrees when the prior lens element is the center lens 612). The surface of the lens set 610 is built up in this stepwise or piecewise fashion until a boundary of the lens set 610 is reached such as at the outer edge of lens 628 or 638 as shown in FIG. 6. Then, the process is repeated in the other direction from the center lens 612 until the other boundary is reached, i.e., the edge of lens 638 for example. Spline fitting may then be used to get a smooth interpolation between the knots used to form each lens element of a lens set. This process of building each lens or lens element of the set by extending calculated slopes over short distances is explained in more detail with reference to the included program listing in the following paragraphs (e.g., the technique of generating the lens elements for each lens set may be thought of as step wise or iteratively constructing each lens element by slopes).

Such an iterative process may result in lenses that increase in thickness from the center lens 612. In some embodiments, a maximum thickness is chosen for the edge lenses 628, 638 and the center lens 612 is provided at a thickness that is lower than this maximum, or alternatively, side edges such as edges 623, 625, 633, 637 (and edges 613 on center lens 612) are provided to prevent or control the thickness of lenses from increasing or to retain a constant thickness for the lens set 610. Should any lens or lens element of the lens set 610 include a lens that causes total internal reflection instead of refracting rays in a desired direction, a linear interpolation of the slope may be made to the end of the lens element (such as element 612, 622, 624 or the like) from that lens or lens element. Then, after a lens element has been designed, the process may be restarted by starting a ray at the next interlace or slice position and repeating the process, but designing the lens element for the desired refracted angle for the interlace or slice under consideration.

The lens set 610 of FIG. 6 illustrates a typical design result for the above-described design or configuration process of the invention where the number of interlaced images or slices is eleven and the number of lenses or lens elements in the lens set or lens microstructure 610 is also eleven. FIG. 7 illustrates in detail showing a lens 624 showing lens surface points 710 plotted or generated based on the ray tracing process described for focusing light from the slice or image element 648 of interlaced image 640 using a known width for the lens 624, thickness for the lens array, $t_{Lens\ Array}$, and, therefore, for lens 624, and angular distribution or viewing angle for the lens 624. Also, FIG. 7 shows the connecting lines or line segments 714 generated for connecting adjacent pairs of the lens surface points 710. In one design process of the invention, after all the lens sets for a lens array have been designed, the end points of the segments 714 generated on the lenses are joined by cubic splines or other useful methodology. This allows a precise interpolation procedure to be made so that the surface of the lenses in the lens sets 610 of the lens array can be accurately calculated and plotted or drawn such as to a degree of fineness or accuracy supported by machining process used to produce the lens array or the tool that is in turn used to form the lens array.

A computer program listing is provided at the end of this description that may be run to perform the design steps described in the preceding paragraphs for a lens set of the present invention such as lens set 610. The computer program may be nm on nearly any well known computing device with a processor or CPU, memory, and a monitor, and the program may be implemented with a computer system running the program with code devices for making the computer perform the steps shown in the program listing (not shown with a figure as such a block diagram is not believed necessary to understand the invention). The program listing provides the details of the algorithm that is used for designing or configuring a lens set such as lens set 610 as described generally above, but it should be noted that only the code or routines associated with these design steps is provided with supporting subroutines that perform refraction, array handling, and the like being excluded for simplicity and brevity sake as these subroutines are well-known to those skilled in the optical arts. Note, the program listing uses the term "lenticules" in place of "lens" or "lens element" as used in the description of the algorithm provided above but this term is used at least in the listing in its more generic or broad sense as a synonym for lens.

The following is a brief description of the computer program or program listing and provides some important ideas used to generate the lens microstructures of the invention. The entire lens array is typically made up of lens sets (microstructures). The lens sets have individual sub lenticular elements that are to be generated mathematically here or by the algorithms of the computer program. Each sublenticule or lens cross section is built up from short line segments each of which are connected at one end to a previously calculated end. The slope of each line segment is adjusted to refract a ray from the interlace location through the segment in the desired direction. The free end of that segment, which slope was determined, is now the location of the start of the next segment. The initial starting point for each sublenticule is the center of the sublenticule. After all of the points are determined for all the sublenticules, customary cubic spline fitting routines are use to characterize the curves. See, for example, "Numerical Recipes: the Art of Scientific Computing," William H. Press et al., 1986 (e.g., at page 88 and other portions of the text).

The usual methods of program data entry are used to input the following design parameters: pitch of the lens set, number of sublenticules in lens set; angular step of distribution from sublenticule to sublenticule; index of refraction of lenticular material; thickness of lenticules/lens array; slope limit; sidewalls (e.g., yes or no which sets whether the thickness is held constant for the lens/sublenticules in the lens set); and step size of knots in forming each sublenticule. The subroutines for ray refraction are well known optics procedures and omitted here in the sake of brevity and ease of explanation of the more pertinent features of the invention. Ray intersections of planes and cubic splines curves are also omitted as these are standard routines used in computer graphics programs. The methodology starts at the desired thickness in the center of each sub lenticule and calculates each part of the lenticule first in the negative direction and then restarts in the center and calculates in the positive direction using the endpoints of the sublenticule. The endpoints were previously calculated from the pitch of the lens set and the number of the sublenticules.

In some embodiments, lens arrays of the invention such as a lens array with lens sets or lens microstructures 610 is formed by first machining or generating a mold that is used to form the lenses of the lens sets and lens arrays such as from plastic or the like. The mold may be generated using an air bearing lathe and precise diamond tooling. In one implementation, the lathe and tooling may have a 0.01 micron or similar resolution to insure that a good optical surface is obtained from the mold. A number of materials may be used for the material of the mold such as a soft brass that can be cut by a diamond to form the tool for the plastic (or other transparent to translucent material) lens array. In some cases, the mold or forming tool for the arrays may be made of a material that is relatively soft and that may not be useful for providing many impressions as would be required for high production runs. In these cases, electroforms may be made such as in a two step process to get the correct polarity of the structure. Further, in some cases, the straight side walls of the side lenses such as side wall 623 shown in FIG. 7 may cause difficulties with release (e.g., electroform release from the tool). To reduce this possible issue, the side wall may be designed with an angular offset or slope, θ, from vertical as shown in FIG. 8 with side wall 823 (e.g., an offset, θ, of 1 to 5 degrees or more).

Figure 9:
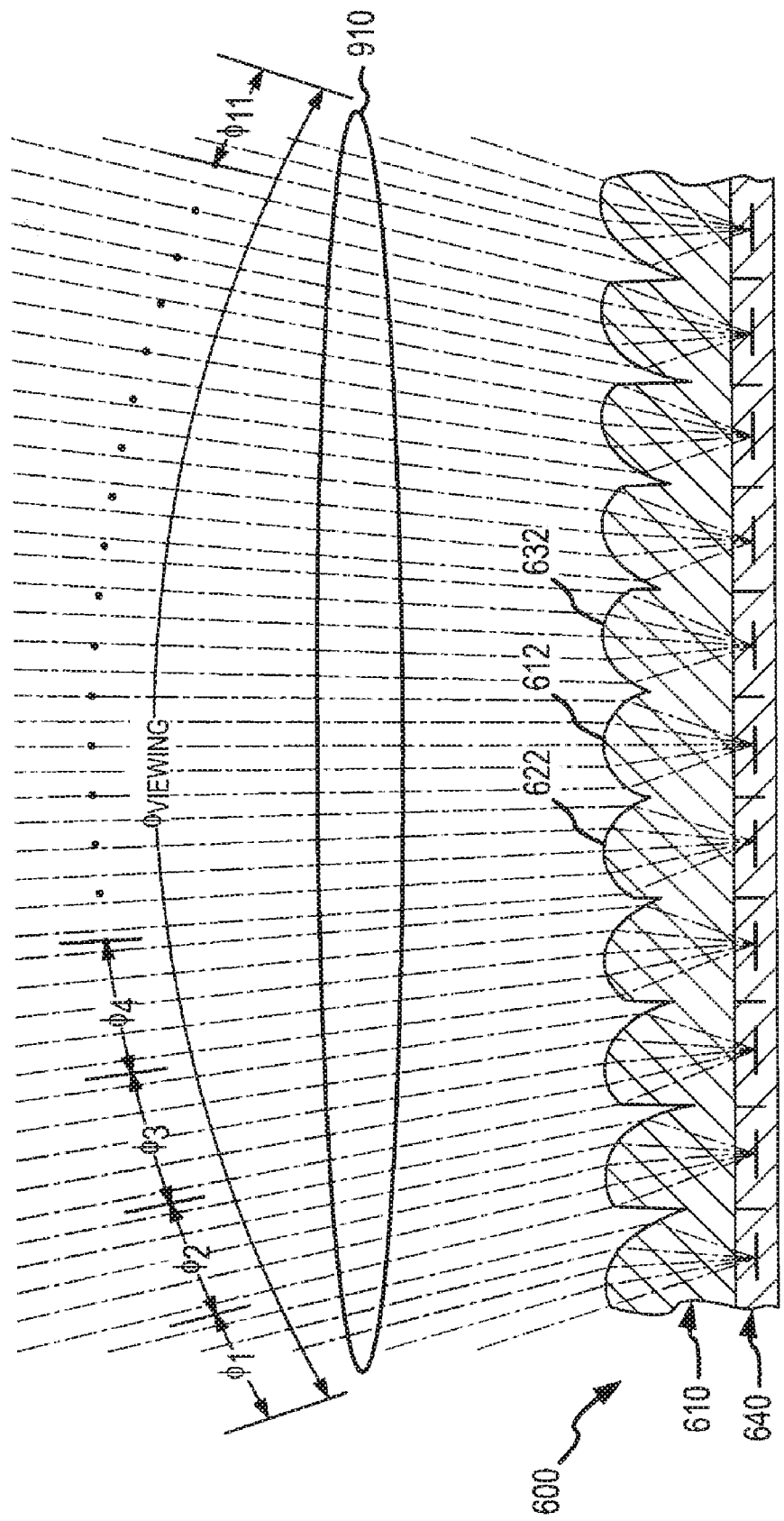
FIG. 9 illustrates a ray tracing for the image display assembly of FIG. 6 showing the effectiveness of having each lens or micro lens of a lens set or microstructure focus on a subset of an set of interlaced slices or elements rather than on all of the slices in the set (such as on one slice as shown (or 2, 3, or more slices but not all) rather than on all slices of the set (i.e., 11 slices in this example))

A check on or verification of the effectiveness of the design of a lens array such as array 610 of display assembly 600 may be obtained by a non-sequential ray trace as shown in FIG. 9. The rays 910 are shown to be focused on or reflected from the image elements or slices of the interlaced image 640 through the lens array 610. Each lens such as center lens 612 and adjacent side lenses 622, 632 each provide an angular distribution or lens-specific viewing angle, $Ø_1$ to $Ø_{11}$, with a unique direction (e.g., provide a stepped angular distribution relative to the next or adjacent lens). The overall viewing angle, $Θ_{Viewing}$, for the lens array 610 is provided by a combination of these lens-specific viewing angles, $Ø_1$ to $Ø_{11}$. For example, with 11 lenses as shown, each lens-specific viewing angle would be about 1/11 of the overall viewing angle (e.g., 2 degrees when the overall viewing angle is 22, 3 degrees when the overall viewing angle is 33 degrees, and so on). A limited range of rays was traced in FIG. 9 to show more clearly the properties of the lenses of the lens set 610 in providing focusing on just a subset of the interlaces of a segment rather than all of the interlaces or image elements (with the subset being just one image element under each or pair/mapped to each lens of the lens set 610 in the embodiment of FIG. 9).

Figure 10:
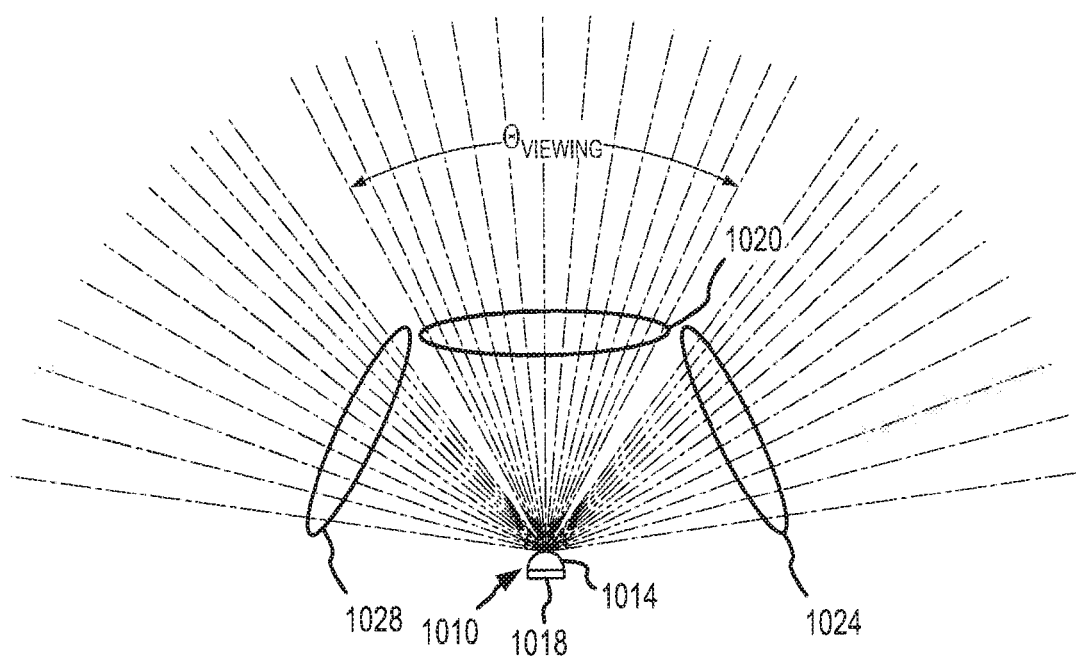
FIG. 10 illustrates in a more complete ray tracing for a single lens or micro lens of the present invention that would be included in a lens set or lens microstructure that would in turn be repeated a number of times to form a lens array of the present invention.

FIG. 10 illustrates further ray tracing for a particular lens 1014 such as a center lens of a lens array 1010 (with the other lenses not shown). The lens 1014 provides viewing angle, $Θ_{Viewing}$, that would be combined with the viewing angles of the other lenses of the lens array 1010 to provide an overall viewing angle. The main distribution 1020 is made up of rays emitting from the pairs of interlaces and lens elements of a lens set. Distributions 1024 and 1028 are the result of rays that pass through neighboring lens elements of the lens set. The main distribution of rays 1020 is shown to be focused on the single slice or image element 1018 from a relatively large distance away from the lens 1014, with wider angles or rays falling outside or toward the edge of the viewing angle having reduced brightness and being out of the main viewing angle (e.g., the lens-specific viewing angle). The rays at the wide angles at 1024, 1028 are also focused on the slice 1018 but are typically outside the viewing zone for the lens 1014.

The lens set 610 of the display assembly 600 of FIG. 6 illustrates the use of eleven lenses for focusing on eleven slices or images from an interlaced image. This is intended to be a useful example of how to implement the invention but not as a limiting example because the number of slices in the sets or segments of an interlaced image may vary, and it may be useful to maintain a one-to-one relationship between the lenses of a lens set and the slices of an interlaced image. Alternatively, the ratio or relationship of lenses to the number of slices or image elements in an image or segment set may be varied. For example, in the example of 11 slices, 3 to 11 or more lenses may be used to provide lenses that focus on a subset of the slices but not on all the slices of an image or segment set of an interlaced image. More specifically, if five lenses were used to view eleven slices in each lens set of a lens array, the center lens could be configured to view three slices over its angular distribution or lens-specific viewing angle while two lenses could be provided in each side set of lenses. These side lenses would be mirror images of each other, and it may be useful for each of these side lenses to focus light from two slices at a desired direction (e.g., with each focusing direction being unique or different from other lenses of the lens set) such that each of the slices of the image or segment set was displayed by the five-lens lens set. This is possible by tuning or configuring each lens of the lens set to provide its own angular distribution or lens-specific viewing angle that combine or are additive to create the overall viewing angle of the lens set or lens microstructure.

Figure 11:
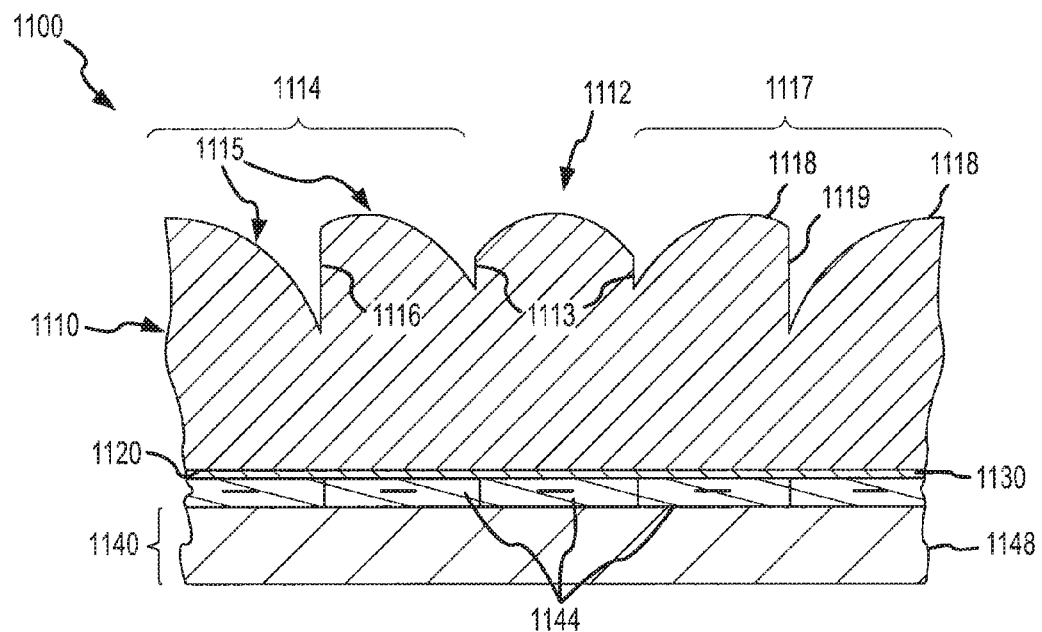
FIG. 11 illustrates with a cross section another image display assembly employing a differing embodiment of a lens set or lens microstructure of the present invention showing that the number of lenses or microstructures/micro lenses may be varied to practice the invention (e.g., 11 is not a requirement and other numbers such as 5 lenses may be used and typically the number of lenses in the lens set is selected as an odd number)

Wile the number and combination of lens numbers and image slices are too numerous to detail here and would be apparent to those skilled in the art with the above description, it may be useful to provide at least one additional example of a lens set configuration. FIG. 11 illustrates another interlaced image display assembly 1100 with the view shown being of one paired lens set 1110 and set of slices of a segment or image from the interlaced image 1140. As discussed above, a lens array for the assembly 1100 would typically include at least two of such lens sets 1110 that would be repeated across the lens array or lens sheet/substrate/layer of the assembly (e.g., lens sets may be provided at a density or frequency of up to 40 or more LPI (lens sets per inch) with 10 to 30 LPI being useful in many embodiments). The assembly 1100 includes a lens set 1110 with five lenses shown as a center lens 1112, a pair of side lenses 1115 in a left lens set 1114, and a pair of side lenses 1118 in a right lens set 1117. In this embodiment, the center lens 1113 includes a pair of side walls 1113 that connect it to adjacent lenses 1115, 1118 while maintaining a desired thickness for the lens set 1110 (i.e., the lens set 1110 is a "constant" thickness lens set in which the thickness of the lens set as measured at the "peak" or thickest portion of each lens is substantially the same throughout the lens set). Likewise, the adjacent lenses 1115 and 1118 to the center lens 1112 have side walls 1116 and 1119 to join or connect them to the next lens of the side lens sets 1115, 1117 while maintaining the desired thickness for the lens set 1110 and a lens array containing the lens set 1110.

The lenses 1112, 1115, and 1118 may be configured or generated to have a particular cross sectional shape as shown with the configuration or design process discussed above and detailed in the algorithm shown in the program listing. The lenses 1112, 1115, 1118 are paired or mapped to image elements or slices 1144 in the interlaced image 1140. In this example, a single lens is paired with each slice 1144 (but a lens may be used to focus light from more than one slice 1144). In one embodiment of the lens set 1110, the lenses 1112, 1115, 1118 are each designed to deviate rays 8 degrees apart relative to the neighboring or adjacent lens in the lens set 1110. In other words, each lens of the lens set 1110 is adapted to provide an angular distribution or lens-specific viewing angle of about 8 degrees and the direction or focus line (or main direction) for each lens is selected such that the angular distributions are additive over the lens set 1110 (e.g., generally do not overlap or only overlap a relatively small amount). Hence, the lens set 1110 of this example would have an overall viewing angle of about 40 degrees (or 5 times 8 degrees). It should be again noted that the angular difference or lens-specific viewing angle does not have to be consistent across the lens set 1110, and in some cases, each lens of the set 1110 may have a different angular distribution. More typically, when the angular difference or distribution is varied, a regular pattern is used such as by setting the center lens 1112 at one lens-specific viewing angle, the pair of lenses on either side of the center lens 1112 at a different lens-specific viewing angle, the pair of lenses adjacent to these two lenses moving outward in the lens set 1110 at yet another lens-specific viewing angle, and so on. In other cases, the center lens 1112 has one angular distribution and each of the side lenses 1115, 1118 has the same angular distribution (but, of course, with a differing main direction or focus line).

The display assembly 1100 of FIG. 11 is also useful for showing that the lens set 1110 may be paired to the interlaced image 1140 by adhesive or a bonding layer 1130. As shown, the lens set (or lens array of which it is one component) 1110 includes a planar side 1120 opposite the lens side, aid this side abuts an adhesive layer 1130 (such as a thermally activated adhesive such as a polyethylene common in thermal laminating processes). The adhesive layer 1130 bonds the lens set 1110 to the interlaced image 1140 which is made up of the image slices 1144 (e.g., an ink layer) and a substrate or backer layer 1148, which may be plastic, paper, or other material upon which the ink of image slices 1144 is printed or provided. In manufacture, the adhesive 1130 may be provided on either the lens set/lens array 1110 or the interlaced image layer 1140. In one example, though, the adhesive is provided on the interlaced image layer 1140 (and, in some cases, a protective layer or coating formed of plastic or other transparent to translucent material may be provided over the ink of slices 1144 such as when the adhesive 1130 is a thermally activated adhesive). In other embodiments, the interlaced image slices 1144 are printed directly onto the surface or side 1120 of the lens set/array 1110 and a plastic or other material backing 1148 is applied with an adhesive that is provided with the backing 1148 (e.g., the position of the ink of slices 1144 and the adhesive 1130 is reversed in the assembly 1100), which is common with gift, smart, credit/debit, and other cards and other fabrication of conventional lenticular material products.

Figure 12:
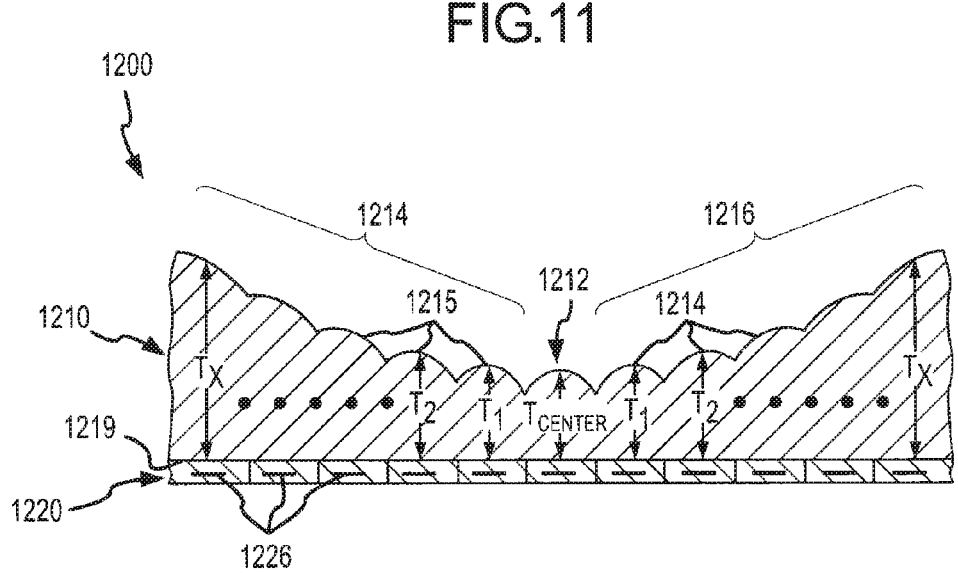
FIG. 12 illustrates yet another embodiment of an image display assembly similar to that shown in FIG. 6 with eleven lens elements in its lens set or lens microstructure but differing in that the lenses or lens elements do not include vertical or near vertical side walls to maintain a constant thickness but instead the thickness increases with each lens from the center lens or lens element.

The lens set embodiments previously discussed with reference to FIGS. 6-11 each have a lens thickness that is maintained constant or relatively constant across the lens set or lens microstructures (and hence, across a lens array or sheet of lens material of the present invention as the lens sets are repeated), and this typically resulted in the use of side walls being used to join the lenses (e.g., a vertical drop to the next or adjacent lens rather than allowing the lens thickness to exceed a preset desired lens or lens array thickness). FIG. 12 illustrates another embodiment of an interlaced image display device 1200 that uses lens sets 1210 in which no side walls are used to join lenses and the lens thickness increases with each lens from the center lens 1212. As shown the assembly 1200 includes a lens set 1210 (or plurality of such lens sets 1210 providing a lens array) with a lens side and a back or opposite side/surface 1219. In this embodiment, an interlaced image 1220 is printed directly on the surface 1219 with a set of slices 1226 of an image segment but in other embodiments a primer, an adhesive, and/or other transparent/translucent layers may be interposed between the surface 1219 and the image 1220.

The lens set 1210 includes eleven lenses but the number may be modified to practice the invention, and the lens set 1210 is made up of a center lens 1212, a left set 1214 of side lenses 1215, and a right set 1216 of side lenses 1217. In this embodiment, the left set 1214 and right set 1216 have cross sections that are selected to be mirror or reverse images when viewed from a plane passing through the center line of lens 1212. The thickness, $t_{Center}$, of the center lens 1212 is less than each of the side lenses 1215, 1217 which have thicknesses, $t_1, t_2, \ldots, t_x$, that increase in a stepwise fashion as the outer edges of the lens set 1210 are approached. In this manner, the lenses 1215, 1217 can be formed without requiring a sharp or abrupt edge but can instead be a continuous curved surface between the end points or edges of adjacent or neighboring lenses.

To generate the cross sectional profile of the lens set 1210, the design or generation algorithm discussed above can be used with some minor modifications (and see the program listing at the end of this description). An exemplary design or generation process may begin with setting a desired thickness, $t_{Center}$, for the center lens (or inner pair of lenses if an even number of lenses is used) 1212 for focusing light from the inner image element or slice 1226. The center lens 1212 is generated as discussed for center lens 612 of FIG. 6 with the exception that when the edge of the lens 1212 is reached the end point becomes the starting point of the next lens (i.e., the adjacent one of the side lenses 1215, 1217). Another difference is that the thickness, $t_{Center}$, of the center lens 1212 is not forced on the succeeding lenses of the side lens sets 1214, 1216. As shown in FIG. 12, this results in a gradual climb with each successive lens from the center lens 1212 being slightly thicker. A ray tracing performed for the structure 1210 was performed and showed that the lenses 1212, 1215, 1217 effectively focused light from the paired slices 1226.

As shown in FIG. 11, a wide variety of lens arrays with differing numbers of lenses or sublenticules, viewing angles, thicknesses, and other parameters may be formed according to the present invention, with or without use of the lens array generation algorithm described herein. With this in mind, the inventors generated a number of additional lens array models and performed ray tracings of these modeled lens arrays or lens microstructures of such arrays to verify their functionality in focusing each lens upon one or more image within a larger set of interlaced images. These arrays and their tracings are not shown in additional figures because the inventors believe with reference to FIGS. 6-11, the program listing, and the corresponding description that their configuration and the method of generating such arrays will be clear to one skilled in the art.

In another modeled and tested (i.e., via ray tracing) lens array of the invention, the lens array included lens sets or microstructures with 19 lenses including a center lens and right and left lens subsets of 9 lenses each. The overall viewing angle of each microstructure was about 38 degrees with each lens providing an angular separation or step of about 2 degrees. The overall pitch of the lens set was 0.5588 millimeters (mm) and the array was provided at a relatively constant maximum thickness of about 0.0508 mm. Sidewalls were included in the side set lenses with an angle of 88 degrees (or 2 degrees from vertical). The lenses were formed in the generation algorithm using 22 steps for each lenticule (with a step size or DelX of 1.33684210526316E-03) with a slope limit of 76 degrees. Ray tracing with the assumption that the material used to form the lens array had an index of refraction of 1.4 was successful in showing focusing on an image placed under the center of each of the 19 lens in the lens array.

In a similar embodiment, a lens array was modeled in which each lens microstructure had the same number of lenses in its lens sets (i.e., 19 lenses in each lens set) and the same thickness and overall pitch. However, in this lens array, the overall viewing angle was about 76 degrees and each lens provided an angle step size of about 4 degrees rather than 2 degrees as used in the prior embodiment. Other parameters including the number of steps and step size used to form or generate the modeled lens of the lens microstructure were retained as was the index of refraction of 1.4. The lens set or lens microstructure was again subjected to ray tracing, and the results again showed very accurate focusing upon a single interlaced image positioned under or on the back or opposite side of the lens array (e.g., as would be the case if the interlaced image were printed or otherwise positioned to abut the planar back side of the lens array). This embodiment is useful for showing the ability to select a particular number of lenses for each lens set and then to design these lenses to each have a structure to provide a desired overall viewing angle for the lens set by providing a particular angular distribution or step for each lens in the microstructure.

In another embodiment of the invention, a lens array was modeled (i.e., generated using the generation algorithm described herein) that used lens sets with 7 lenses including a center lens and side subsets each having 3 lenses. In this embodiment, the following parameters were used: lens set pitch of 0.2 mm; a lens array thickness of 0.0762 mm; an angular step size (or angular separation) of about 5 degrees to provide an overall viewing angle of about 35 degrees; an index of refraction for the lens array material of 1.4; vertical sidewalls (i.e., at 90 degrees from the planar back side of the lens array); and 22 steps used to generate each lens with a step size of 1.29870129870913E-03 mm and slope limit of 74 degrees. The modeled or generated lens microstructure was subjected to ray tracing to test its ability to focus light upon a single slice or image element from a set of interlaced images, and the ray tracing plot proved the efficacy of lens arrays using this embodiment of lens sets or microstructures to display interlaced images.

An additional lens array embodiment was modeled that altered this 7 lens per lens set embodiment by modifying two parameters, Specifically, the index of refraction for the lens array material was changed to 1.64 to show that the lens arrays of the invention can be formed from a variety of materials and still provide desired focusing results. Also, the angle step size or angular distribution was increased to 6 degrees such that each lens set provided a viewing angle of about 42 degrees rather than 35 degrees. The lens microstructure generation algorithm was utilized to generate a lens set or microstructure with these parameters or characteristics, and ray tracing of this modeled lens set verified that the lens set is capable of focusing light upon one or more interlaced images positioned adjacent each lens over the desired viewing angle of 35 degrees with each lens providing an angular step or separation of about 6 degrees. From these and the previous specific examples, it will be appreciated that the general concepts of the lens sets or microstructures used to form lens arrays for displaying interlaced images can be used to generate a huge variety of lens arrays simply be altering one or more of the design parameters. This allows a designer to select the parameters that are important to them such as viewing angle, number of interlaced image elements that need to be displayed under each lens microstructure, or the like and then to generate lenses for each microstructure with a geometry that provides these desired results or satisfies the input parameters.

The use of lens microstructures or lens sets in lens arrays to bend and focus light in order to view interlaced images provide an effective alternative to conventional lenticular technology. Lens arrays with properly formed/generated micro lens structures can replace lenticular lens arrays and allow viewing of interlaced images. Significantly, the use of lens arrays of the invention can decrease lens mass and/or thickness such as up to 90 percent or more reductions. The lens design criteria of conventional lenticular materials (i.e., including the requirement that the lenticule provide a thickness that allows focusing on a large set of interlaced slices) do not apply to these structures as the lens sets are used to replace the much larger and thicker conventional lenticules, but the lens microstructures or lens sets remain optically sound for imaging and generally are not diffractive. The micro lens set designs follow typically optical characterizations such as Lambert's law and Snell's law, but the lenses of each lens set act together as a group to display interlaced images paired or mapped to the lenses, thereby replicating the function of traditional lenticular lens arrays. However, they are not traditional lenticular lens arrays in part because the lens sets are not uniform lens arrays with all lenticules having identical cross sections but instead, each lens in a lens set or lens microstructure is configured to provide a unique focus line (or main direction) over a lens-specific viewing angle.

The lens arrays and their plurality of repeating lens microstructures can be formed from plastic, glass, ceramics, or other transparent to translucent materials from or using coatings, films, and/or other substrates. The lens microstructures can be custom designed for the combination of interlaced images and, as discussed, may have a pre-engineered overall viewing angle and lens-specific viewing angles or angular distributions and are also pre-engineered as to the number of interlaced images wider the lens set or lens microstructure. Unlike conventional lenticular lenses, a lens array of the present invention can be used to replicate the functionality of a very course lenticular lens array without adding much (or any) mass to the array (e.g., without requiring a thicker lens array as the lens array becomes coarser or a lower LPI). For instance, a 15 LPI conventional lenticular lens array with a 22-degree viewing angle would likely require about a ⅜" thick lens array if made of acrylic. In contrast, a lens array with the lens microstructures of the invention can be made at about 3 mils thickness but yet perform similarly to the conventional lenticular lens array or better but yet use less than about 5 percent of the mass or lens array thickness.

It may be useful to elaborate at this time on exemplary methods of manufacturing and/or tooling the lens arrays of the present invention and more particularly, the lens sets or lens microstructure of the present invention as well as image display devices and products that incorporate such lens arrays. In some embodiments, the lens microstructures of a lens array can be engraved in a cylinder or plate, with care taken to be extremely accurate to create the proper optics. A preferred method of engraving is using an air bearing lathe and custom diamond tooling. Air bearing lathes operate by spinning the cylinder or cylinder with shim or plate on a cushion of air rather than bearings or other mechanical devices that can have worn or gear slop or play. For the formation of the tool to create accurate lens microstructures of a lens array, it is preferable to provide accuracy at the micron level or even at the angstrom level.

In order to create an accurate embossing tool, custom diamond tools pre-engineered to a desired radius are made. As the lens elements are not usually defined by a particular radius, the cutting tools contour the embossing tool tangent to different parts of the radius tool as needed by the design determined by the usual cutting path of numerical control or N/C programmed machines. These tools mirror the desired design such as an array with lens sets shown in FIG. 6, 11, or 12. It is typically useful to tool right and left hand diamond cutters to make the structure. The center lens is typically symmetrical, and the outside structures or lenses to the right and left (i.e., in the left and right side lenses) have different angles or angular distributions per the desired design of the optics of the overall structure. As discussed, the desired viewing angle of the total lens microstructure is a combination of all of the substructures in each lens set. Each of the micro lens structures has a different angle with a different or unique focus direction and is tooled differently to complete the lens structure. Each sub-lens structure is designed to complete the focus of the master lens structure. Each of the master lens structures or lens sets simulates the function of a conventional lenticule or lenticular lens. The design of the lens structures are the result of testing various possible designs and structures and determining what happens to the light rays going into and back out of the structures to the viewer.

Each of the microstructures may be as small as 10 microns or less and usually would be about 25 to 50 microns or more across. In some embodiments, each of the lens microstructures has a symmetrical center micro lens and a set of right hand and left hand lenses that mirror each other in design. Further in a typical embodiment, each of the sub structures or lenses on each side has an angle step that is pre-determined and the combination of the lens angular distribution or lens-specific viewing angles total the desired overall viewing angle of the lens microstructure or lens set. Prior to tooling or manufacture, the lens microstructures are adjusted/tuned and tested in a computer program, such as the program listing provided herein and/or with ray tracing programs, to verify where light rays focus to the image and back to a viewer. Each lens or microstructure within a lens set may have be generated by providing or plotting 2 to over 100 data points, and these plotted data points can be adjusted for the numerous (e.g., millions) of possible combinations so as to enhance the use and function of the micro lens structure.

While one current known method of creating the embossing or extrusion tool, which in turn is used to form the lens arrays, is by using diamond tooling, other embodiments use laser etching or photo etching into nickel, carbon, copper or other metals to form the embossing or extrusion tool or to form molds. These alternative methods can result in accurate tooling but may require more extensive testing and development to provide the accurate three-dimensional shapes necessary to create the desired lens microstructures needed for lens arrays of the invention.

With the embossing tool, extrusion tool, or mold formed, the fabrication of lens arrays with the lens sets or lens microstructures of the invention can be performed or completed. The lens microstructures and arrays with pluralities of such microstructures may be created by a number of manufacturing methods and into or using a variety of materials. The materials used for forming the lens arrays may be glass, nearly any type of clear (i.e., transparent to translucent) plastic including but not limited to PET, propylene, OPP, PVC, APET, acrylic, or any clear plastic, and/or a ceramic. In many embodiments, the preferred base material is a plastic, and the plastic may be extruded, calendared, cast, or molded with the tools formed as described above to provide a mirror image of the lens sets or lens microstructures arranged in a lens array (e.g., a plurality of side-by-side, linear lens sets selected in number to provide a desired frequency such as 10 to 50 LPI or another useful frequency to suit a particular interlaced image).

One preferred application or fabrication technique is inline embossing at high speeds using a roll embossing tool. In this embodiment, a film is cast or extruded, and a pattern providing the lens array is placed into the film with a heat or chilled roller. A good film for this application is usually a stable film such as a PET, cast propylene film, or the like. These films can be embossed in thin films of less than one mil to 3 mils or more. A preferred thickness for lens arrays is in the two to five mil range. In this application, the film thickness with its lens microstructures can be pre-engineered to focus directly on the back of the film. The film itself can be printed in a web or roll form at very high rates of speed (e.g., over 2,000 feet per minute) in wide web applications. To form image display devices (such as labels, decals, cards, or the like), the film or sheet with lens arrays is mirror or reverse printed with the corresponding interlaced images. At this point, individual devices or products may be cut from the combined rolls or sheets. The film also may be embossed in a thickness that is less than the desired thickness for focus and printing so that an adhesive can be added to the film (i.e., between the lens array and the image slices) so that in combination the adhesive and the film provide the thickness required to focus to the interlaced images properly. The index of refraction of both the film and the adhesive in combination is taken into account in the overall formula or algorithm discussed above for generating lens sets or lens microstructures. In some cases, a film may also be co-extruded with a coating such as a UV, solvent, or water based coating that may be embossed or extruded on the film with the micro structures built into the coating.

With a pre-made film, one can also print in a sheet or web form. The film can be applied over the printed (interlaced) image after the fact. This can be done using equipment such as thermal film applicators like D and K, Bellhoffer and the like in which the film is heated and the adhesive is a hot melt chemistry made with EVA/polyethylene and is activated and applied in register to the printed and interlaced images. This can be done in line in a web process or in a sheet environment.

While extrusion techniques typically do not provide extreme film thinness and are primarily used to make plastics no thinner than 6 mils and usually between 6 and 30 mils, extrusion processes combined with the lens microstructures of the present invention can provide a much thinner lens array as opposed to traditional lenticular lens structures, which leads to a significant material cost savings as well as providing lens sheets or arrays that are very flexible and easy to apply to other structures/products. For example, a lens sheet or array can be extruded at a very coarse LPI for billboards and other applications in a relatively thin structure. In one implementation, a 1 or 2 LPI lens for a billboard may require a lens structure of over 1" thick plastic if fabricated with conventional lenticular lens material, but this can be done with a microstructure lens array of about only about 20 mils thickness. Hence, extruded plastic lens arrays of the present invention are economical with respect to material costs and practical while a conventional lenticular lens array in a thickness of over 1 inch is not cost effective and is impractical.

Another method of manufacturing image display assemblies with lens arrays of the invention is to print the interlaced images on paper or plastic and then either in line or off line, printing or applying a coating, which may be an e-beam, UV, or water-based coating. The coating is applied in a pre-determined thickness, and the lens microstructures may be embossed into the coating to form the structures and a lens array over the interlaced images at high speed. Again, this may be done in line or off line in a sheet fed press such as a Heidelberg or Komori press or a web press such as a Goss, Heidelberg, or other type of flexo or web offset press. Further, while most embodiments using an embossing tool would use a roll or cylinder for the embossing tool, in any of the above embodiments, it is also possible to use a platen press or flat plate to emboss films or coatings.

With these various methods of manufacturing lens arrays and products including the arrays generally understood, it may be useful to further explain some of the preferred methods of manufacturing lens arrays according to the invention beginning with film embossing. Film embossing is a preferred method of manufacture that is anticipated to be easily adapted for producing lens arrays or material with the lens sets of the present invention. In this embodiment of manufacture, there are several methods of performing the embossing. Embossing can occur at the time a film is cast, calendared, or extruded. Normally, the embossing is done in line with a chilled embossing roller while the film is still hot. The pressure is applied between a bottom and top roller. For example, the bottom roller may be a polished roller and the top roller an engraved roller, e.g., made out of a nickel-coated copper that is accurately machined in an air bearing lathe. The hot film, which may be propylene, PET, cast PVC, calendar PVC, cast propylene, PETG, or any combination of film or co-extrusion. While the preferred substrate or film may be polyester or PET, any of the substrates can be used. PET films tend to be more stable and maintain the desired structure through the printing and embossing process better than many of the other films. It is also important to note that the refractive index of the material chosen preferably is matched to the desired structure to make microstructures that provide accurate focusing on interlaced images slices. Depending upon width, temperatures, pressures, and other factors, the film may be embossed at up to 10,000 feet per minute. One reason for using a chill roller in the film embossing process is that the molecules in the film form and freeze into place forming the microstructures more accurately when a hot film is embossed with a chill roller regardless of the process.

In some embodiments, cold film is used. Cold film can be heated and embossed with a hot roller forming the microstructures. This is normally done at slightly below the melting temperature or at the melting temperature of the film. The speed at which thins embossing can be done is based upon the heat and pressure of the equipment available. For example but not as a limitation, if a substrate melts at about 300° F., embossing is preferably done at about that temperature and, in some cases, at about 6,000 feet per hour.

In other embodiments, cold embossing is used to form lens arrays of the present invention. Cold embossing can be done using extreme pressures between nip rollers while narrow web widths are easier and require less tonnage. It is possible, however, in some embodiments to emboss in wide web at up to and over 60-inch web widths. Such cold embossing of the lens arrays into plastic or other material substrates can be done at fairly high rates of speed such as up to about 10,000 feet per hour or more. This is done much the way holographic embossing patterns are embossed in film. The structures tend to be accurate, but the life of the tool is sometimes not very long due to the higher pressures utilized.

Film embossing to form lens arrays of the invention may also include platen embossing. Flat dies are engraved in copper, magnesium, nickel, and other metals. These dies are placed in equipment such as Bobst die cutters and Heidelberg's, Kluges, and other equipment manufacturers' die cutters, punches, presses, or the like used in platen embossing. The film may be fed through in rolls or in sheets and embossed with heat and pressure or just pressure to form the lens sets or lens microstructures on a side of the film or substrate. The microstructures can be embossed onto any of the films using pressure and or heat and appropriate dwell time to form the microstructures. A significant tonnage or high pressure such as needed to emboss holograms is generally used to emboss the film in the case of platen embossing. In this embodiment, one can have "spot" lens structures that can be registered to the printing in a way such that the lens does not always appear over the printing.

For embossing of the lens microstructures to be effective, the flat dies or rollers/cylinders have to be accurately formed to includes a reverse image of one or more of the lens microstructures (e.g., a number of parallel lens set extending side-by-side to provide a lens surface of a lens array). In addition to using diamond or other cutting tools to form the dies or embossing rollers, one of the methods of manufacture is the use of photo-etching for the engraving of the flat embossing dies or embossing cylinders or rollers. A standard method of photoengraving or photo-etching is done by using an emulsion over a metal or polymer surface and then exposing the areas in which the photo emulsion may be exposed to UV light. The areas that are exposed generally remain in tact (but it can be the opposite effect), and the remaining area is exposed and unprotected. An acid bath is generally used to wash away the unprotected areas (i.e., the areas that lacked the protective emulsion). The metal or polymer with a pattern defined by the emulsion is left behind leaving raised surfaces with a desired pattern and contour (e.g., a reverse image of a particular set of lens microstructures desired for a lens array or for a number of lens arrays as it is expected that numerous lens arrays may be embossed into a film or sheet at one time in manufacturing processes, paired with a plurality of interlaced images, and later cut out to provide display devices such as cards or the like). The process is generally used to make etched dies for embossing papers and foils where some three-dimensional relief is needed. Normally, this process is done with a stationary light source.

In order to complete more complicated diffraction gradings for imaging and non-imaging applications for lenses including diffraction gradings, it is preferable in some embodiments to take this photo emulsion technology several steps further. In order to create accurate depths in metals and polymers, processes used should be accurate for length of exposure of the light source, strength of the light source, composition of the photo-polymer involved, and other factors. Using lasers as the light source in place of or in addition to UV lights gives a more intense and controlled exposure, and also provides enhanced control and the angles useful to create exposures not through film (although film can be used) but controlling the angles of the exposure in an X axis and an Y axis (or X-Y coordinate system) over the polymers, metals, and photo emulsions. Actual metals used for the cylinders or dies may be magnesium, nickel, copper, carbide, or other metals or polymers such as hybrids made by DuPont and other companies. By varying the above factors in combination with the angles of the lasers, almost any pattern can be programmed into the etching in three dimensions into the dies or cylinders. Again, after the exposures are made, protected metal or polymer left remains in place while the remainder of unprotected surfaces/material is removed such as with acid or the like depending on the material of the die or roller surface. One can create microscopic structures in three dimensions programmed into a data storage file through these photo-polymeric exposure methods and lasers that move axially or otherwise to expose the selectively protected surface of the die or cylinder to be used as an embossing tool to form lens microstructures.

Another preferred method of forming lens arrays according to the present invention is by using an ultraviolet (UV) or e-beam coating to form the structures in a web over a film or substrate (i.e., the lens array would include both the substrate and the web/coating in its array thickness). In a first embodiment of such coating processes, a base film is used that may be any of the films mentioned above. The film may be coated with a UV coating at about 1 to 5 mils, and the coating can be cured through an engraved roller which may be glass or clear plastic. The roller is clear such that the UV or E-beam is directed to pass through the roller while it is in contact with the substrate aid squeezing the coating into place on the base film, whereby the microstructures are formed exactly or within very tight tolerances while they are cured to form a lens array as shown in the included figures.

There are other preferred or alternative methods of using e-beam curing or UV curing to make lens arrays with lens microstructures rather than using a clear cylinder to shine UV light through while in contact with the embossing cylinder. For example, one coating method uses a modified laminator to emboss the pattern onto one surface of a film or substrate. This can be done or accomplished with very little pressure using an engraved cylinder and an application roller that applies UV or e-beam coating to the film (which is likely to be propylene, PET, or the like). The coating on the film or substrate is then cured through the film while the film is in contact with the embossed roller. In this method, the speed can be in excess of 10,000 feet per hour and can be done without excessive wear on the embossing cylinder. A downside or possible issue with this method is the cost, which tends to be higher because of the UV liquid used to cast the impression. However, because most of the lens microstructures are less than a few microns deep, a thin coating is sufficient for producing the lens microstructures (e.g., a coating of less than about 1 mil and more typically less than about 0.3 mils such as about 0.25 mils may be used successfully to create a plurality of lens sets or microstructures with a coating).

In an alternative coating process, a base film is coated with any of the clear coatings mentioned above (keeping in mind that any coating and its refractive index is combined with the thickness and appropriate film refractive index for the appropriate and pre-engineered thickness of the lens array). After the coating is applied to the substrate, it is cured and then embossed. In some cases, the coating is only partially cured and then embossed while it is in a semi-liquid state. In some other cases, the coating on the substrate or base film is embossed in a total liquid state or more liquid state and then cured after the embossing such as down the web a few feet up to several hundred feet. In the former case where the liquid is partially cured, the coating may have a final curing later down the production line either immediately or down the web several feet, and in some cases, the coating may be pre-engineered to post cure in a solid state several hours or even days later to an acceptable hardness.

As shown in FIGS. 1-12, the display assemblies of the present invention generally include a lens array combined with an interlaced image. The lens array and the interlaced image may be combined into an assembly or product in numerous ways to practice the invention. For example, printing of the interlaced image can occur first in gravure, flexography, offset (lithography), screen-printing, or digitally prior to the application of the micro lens structures (e.g., before a lens array and interlaced image are combined). This printing could appear in roll, sheet fed, or other method in any of the printing methods. After the interlaced graphic is printed, the lens array or film having numerous lens sets or lens microstructures on one side is applied to the interlaced image (or a substrate upon which the image is printed) by film lamination of a pre-embossed lens structure. This application of film to the pre-printed roll or sheet fed structure can be done in line on a web press (gravure, flexo, web offset, or any other press feeding roll stock) either in line with the printing or off line in a post lamination process.

In some embodiments, the film is applied with a water based adhesive, hot melt, or thermal adhesive such as is extruded in EVA or other methods directly onto the film with a hot melt polymer such as polyethylene, common to the thermal lamination area. Any adhesive used preferably is as clear as possible, and its refractive index is taken into account in the total calculation of each of the polymers and the thicknesses and combined appropriately to equal the correct combined refractive index necessary to focus the lens microstructures on the pre-interlaced images. The necessary "critical" alignment is as set forth in the attached figures, so that the interlaced printed image and the lens structures coincide properly and align along their elongate axes as shown. This process can be done in line with the printing in a web or roll format or off-line later after the roll is printed. Again, the adhesive is preferably clear and the thickness of the adhesive and its refractive index is known so that the total of the polymers (or substrate layers of a finished product) has a desired refractive index to focus to the interlaced images underneath the combined layers or substrates (e.g., underneath the lens microstructures in the lens array, an adhesive layer, any primer layers, and any other material thicknesses between the lens' surfaces and the interlaced image slices).

The combination of the lens array with the interlaced image may also be done in sheet form, such as with the printed sheet or cardboard in an interlaced form and then post laminated with a pre-embossed (and many times pre-adhesive) coated substrate or film roll containing the lens microstructures for displaying the interlaced images. Again, the alignment in the proper direction is important. The display assembly fabrication can be done with a Bellhofer, D and K Laminator, GBC laminator or other types of laminators that apply film through hot melt (EVA type, extruded, and activated between 180° F. and 350° F.) or solvent-based pressure sensitive, urethane, or water based adhesive. Again, line up or Y-axis registering is important to achieve desired results. Normally, in a sheet fed environment for packaging, the sheets of paper or plastic would be printed with an interlaced image. Then, the roll of pre-embossed film (or roll of lens array material) would be attached through whatever adhesive process is being used such as heat, pressure, or a combination of both.

Much as described above, UV, E-beam, water-based embossed, and other post-print coatings may be applied directly to the printed substrates. For example, these coatings that provide the lens array may be applied via application roller in the appropriate and pre-engineered thickness for the correct combination of refractive indexes to form the lens microstructures on top of or adjacent to the printed interlaced image on the substrate (e.g., plastic, paper, or other material substrates or layers). The coatings may be embossed over the interlaced printing by way of an engraved cylinder, flat die, or other method using pressure or heat and pressure thereby forming the coating into a lens array of many lens sets or lens microstructures. The coating may also be partially cured before embossing, uncured in liquid state, or partially cured and post-cured later by means of E-beam, UV, or any other method including solvent or water evacuation. This embossing may be in the form of a roll or sheet and will be accurately post embossed.

In some embodiments, it is desirable to use printing offset, digital printing, screen printing, or other printing onto a sheet fed film or web and then to apply a lens array. For example, a film may be embossed to contain the lens array (e.g., a plurality of lens sets or lens microstructures) and then be laminated to the preprinted substrate in line or in an off line process. The interlaced image is printed so that the files match the lens array configuration and its lens sets exactly or within tight tolerances, with such alignment generally being required to be excellent as with any lens system to achieve desirable results. The film upon which the lens array is embossed can have an EVA adhesive upon the non-lens or planar side and be applied with a Bellhofer, D and K or other thermal laminator at about 150 feet per minute over the substrate. This is particularly advantageous for printing cartons and thicker boxes. The substrate, e.g., cardboard or board of some type such as SBS and boards of 10 mils to over 40 mils, can be printed with the interlaced image on a traditional sheet fed system such as a Heidelberg, Komori, Roland, KBA, and the like. The interlaced image can be relatively coarse (such as 20 to 60 LPI), and the microstructures applied can be embossed on the film, which will total up to about 2 to about 10 mils or more in thickness. The lens array (e.g., the embossed film combined with any adhesive/primer) functions similarly to and provides the quality that a conventional lenticular lens array over 80 mils thick would provide. Obviously, not only is it impractical to use a lens over 80 mils, it is also cost prohibitive for most applications. In contrast, the embossed film of the present invention costs very little to produce and packaging an item or product with that lens array (e.g., a wrap or the like) will have a dramatic effect (e.g., in some embodiments over 40 views of animation are provided with only a few mils of lens array material).

Any and all of the methods described herein can be reproduced using a combination substrate with the same results and methods of manufacture. In these embodiments, the substrate or film itself can be made in several different ways. The base films maybe a combination of APET, PETG, and/or combinations of film such, as PET and other softer films. In many cases, the top line or layer of film is a softer film like polyethylene combined with a tougher substrate such as a polypropylene. In these combination substrates used for forming lens arrays, the base film can provide stability while the top film can be softer and easier to emboss with the lens sets or lens microstructures of the present invention to form a lens array including the top film and tougher substrate. An ideal combination may be a PET base film with a softer propylene film laminated with a solvent based adhesive or solvent less adhesive such as a urethane adhesive like "More Free 403" by Rohm and Haas. The top film can be laminated with a thermal film EVA adhesive as well.

As described with reference to FIG. 1 and elsewhere, a display assembly can readily be formed simply by printing directly on the reverse side of a pre-embossed film or substrate (i.e., onto the back or planar surface of a lens array). One efficient method of production of display assemblies involves printing onto a pre-embossed film a pre-engineered number of interlaced image slices or sets of slices, e.g., sets of slices equal in number to the number of lens microstructures in the lens array opposite the interlaced image. The printing can occur in sheet or roll form at a very high rate of speed (e.g., over 2,000 feet per minute). The film may be printed in a course and easy to print interlaced image configured for a conventional lenticular material of 20 LPI or less. Most of the lens sets created at this frequency are as powerful for imaging as the normal thicker counterpart found in conventional lenticular material. In this case, the film lens will be as much as 98% thinner and more cost effective to show animation and 3D. One benefit is that the display assemblies or products formed to include a lens array of the present invention with a corresponding or matched interlaced image can be produced for about the same cost as a normal film laminated product that is not configured for displaying interlaced images. With implementation of the present invention, it is anticipated that it will become acceptable to print to the back of the lens with the correct file and application. This is significant when it is compared with the manufacture of conventional lenticular material device because the invention allows one to print in web, which would be impossible with the thicker conventional lenticular material. In contrast, an equivalent conventional lens may be more than 100 mils thick and could not even be printed offset. Costs are expected to be extremely low and represent less than 5% (i.e., a 95% cost savings) of traditional lenticular materials, and further, traditional lenticular material cannot be printed in web.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. The above discussion provided examples of lens sets with linear or elongated lenses. However, in some embodiments, the teaching of the lens microstructure or lens sets each configured to provide focusing on one or more interlaces (i.e., a subset) of a segment set can be applied to produce non-linear lens sets. For example, the lens sets may be alternative shapes with round (concentric lenses extending out from a round center lens or "bugs eye" arrangements of round or other-shaped lenses), square, and diamond shaped structures being just a small portion of the possibilities to extend the teaching of lens sets described herein.

The above description mainly provides a description of lens arrays formed from numerous lens microstructures in which an odd number of lenses are provided with a center sublenticule or lens and two mirror image side sets of lenses. While this is one preferred configuration for many applications, the center lens or sublenticule need not have exactly zero degrees of deviation for the rays and lens sets may also have an even number of sublenticules or lenses. For example, the sublenticule immediately to the left of the center of the lens set is, in some embodiments of the invention, designed to deviate the interlace rays −1 degree and the sub lenticule immediately to the right of the center of the lens set could be designed to deviate the rays +1 degree. The second lenticule left of the center of the lens set could have a deviation design of −3 degrees and so on. A comparison of angular steps or deviations of two lens sets of the invention, one with a center lenticule designed for zero degrees as in many examples of the present description, with a similar design with no center lens or sublenticule, is given as follows: −8, −6, −4, −2, 0, 2, 4, 6, 8 for one embodiment and −7, −5, −3, −1, 1, 3, 5, 7. Each of these lens set designs has 2 degrees of deviation from sublenticule to sublenticule and would likely function similarly (e.g., be hard to distinguish from one another in use in displaying an interlaced image). The concepts described above for odd numbered lens sets can easily be extended to such even numbered lens sets, and these "non-zero" designs are, of course, considered within the breadth of the current description. Further, the above examples of lens sets typically call for a lens set to provide a centered viewing angle from a center lens or center line of a lens set. However, alternative embodiments may use "biased" lens sets in which the angular distribution is not centered. For example, applications might need or be more effective with a bias to the angular design such as a lens set with an even number of lens with an off-center zero deviation of light rays (e.g., a 6-sublenticule lens set may be arranged with deviations of −8, −6 −4, 2, 0, 2 degrees with many other examples being apparent to those skilled in the art), which may be useful in a package or product that might viewed from the side.

Program Listing For Views Microstructure Generation/Configuration

```
toll = 0.0001 'tolerance for completing loop.
'yy1 is starting y value
icount = 0
nummissed = 0
pitchsub = PitchOverAll / CDb1(NumberSubLenticules)
        n = 0 'start at center to get height of endpoints to use as starting points for slant walls
                'each lenticule uses the previous sidewall height as a starting point.
        thicknesstemp = Thickness 'the temporary thickness is initially set to the desired thickness
'it will be changed if the thickness tolerance is exceeded and the entire calculation will be
repeated until the desired thickness is met.
                i = 0 'center spline knot of the nth sub lenticule (in this section n = 0 and the center
lenticule is calculated)
                        X(n, i) = (XLenticuleEnd(n) + XLenticuleEnd(n + 1)) / 2# 'start at center of a lenticule
                        Y(n, i) = thicknesstemp 'go from the center and work out to the ends of the lenticule
                        'left hand side of center lenticule
                        XDelta = −DelX 'step size of knots.
                                While X(n, i) > (XLenticuleEnd(n) + toll)
                                s1 = X(n, i)
                                yy1 = Y(n, i)
                                i = i − 1
                                X(n, i) = s1 − DelX
                                xx = X(n, i)
'the values of the y starting position, x position, and step size to be taken for sublenticule n are
passed to a subroutine which will calculate the y position for the next x location
                                        Call Y CoOrdinateFind2(n, XDelta, xx, yy1, yy2, Flag)
                                        End If
                                        If Flag = True Then
                                        Y(n, i) = yy2
                                End If
                        Wend
NumPtsLenLeft(n) = i' the knot for the left hand side of lenticule n is saved.
'The right hand side of center lenticule is calculated in a similar fashion
*
Etc
*
End If
        NumPtsLenRight(n) = i
*******************************************
        'now do the left side lenticules using the center lenticule end points in sidewall sub.
        For n = 1 To LenNumLeft Step −1
                thicknesstemp = Thickness
GL100:
                i = 0
                X(n, i) = (XLenticuleEnd(n) + XLenticuleEnd(n + 1)) / 2# 'start at center of lenticule n
                Y(n, i) = thicknesstemp 'go from the center and work out to the ends of the lenticule
                'left hand side of lenticule
```

```
                XDelta = −DelX
                While X(n, i) > (XLenticuleEnd(n) + toll)
                    s1 = X(n, i)
                    yy1 = Y(n, i)
                    i = i − 1
                    X(n, i) = s1 − DelX
                    xx = X(n, i)
                    Call YCoOrdinateFind2(n, XDelta, xx, yy1, yy2, Flag)
                    Y(n, i) = yy2
                            If Y(n, i) > Thickness Then 'get the adjustment to keep the thickness uniform
                                If Y(n, i) > thicknessmax Then
                                    thicknessmax = Y(n, i)
                                End If
                            End If
                        Else
'if the case total internal reflection (TIR) was obtained the slope is calculated in the TIR sub.
                            Call Generate_Lenticule_TIR_End("Left", n, i, xx, yy1)
                            nummissed = nummissed + 1
                        End If
                        Call Generate_Lenticule_Sidewall_Intersect("Left", n, i, flagslant) 'intersect possibly
sloping side wall
                    Wend
            NumPtsLenLeft(n) = i
The right hand side calculation proceeds in a similar manner except for sign change of Xdelta.
'Here is where the resulting maximum thickness is compared to desired thickness
            If(thicknessmax − Thickness) > 0.00001 * Thickness Then
                thicknesstemp = 2# * Thickness − thicknessmax
                thicknessmax = 0#
                GoTo GL100 'start over because maximum thickness was larger than desired
            End If
            NumPtsLenRight(n) = i
        Next n
        LenticulesGenerated = True
'for no side walls, start at the center and start each lenticule at the endpoint of the previous
lenticule
If SideWalls = "None" Then
        XDelta = DelX
        X(0, 0) = 0#    'start at center
        s1 = −DelX
        For n = 0 To LenNumRight
            i = 0
            If n = 0 And i = 0 Then
                Y(n, i) = Thickness
            Else
                Y(n, i) = Y((n − 1), NumPtsLenRight(n − 1)) 'start the new lenticule y at the end y of
previous lenticule
                X(n, i) = XLenticuleEnd(n)
            End If
            NumPtsLenLeft(n) = i
            While X(n, i) < (XLenticuleEnd(n + 1) − XDelta + toll)
                yy1 = Y(n, i) 'starting height of element
                s1 = s1 + DelX
                i = i + 1
                X(n, i) = s1 + DelX 'x position of next element
                xx = X(n, i)
                Call YCoOrdinateFind2(n, XDelta, xx, yy1, yy2, Flag)
                If Flag = True Then
                    Y(n, i) = yy2
                Else
                    nummissed = nummissed + 1
                End If
            Wend
            NumPtsLenRight(n) = i
        Next n
'mirror the center lenticule (only half was done above)
        For i = 0 To NumPtsLenRight(0)
            j = −i
            X(0, j) = −X(0, i)
            Y(0, j) = Y(0, i)
        Next i
        NumPtsLenLeft(0) = −NumPtsLenRight(0)
'mirror the lenticules (the center is 0 and left alone)
        For n = 1 To LenNumRight
            k = −1
            For i = NumPtsLenLeft(n) To NumPtsLenRight(n)
                j = −i
                X(k, j) = −X(n, i)
                Y(k, j) = Y(n, i)
            Next i
```

```
                NumPtsLenRight(k) = NumPtsLenLeft(n)
                NumPtsLenLeft(k) = −NumPtsLenRight(n)
        Next n
        LenticulesGenerated = True
        If nummissed > 0 Then
                MsgBox ("Number of missed points was    " & nummissed)
                Exit Sub
        End if
    End If
End Sub
'the sub that calculates the y position based on the desired ray direction and given x location in
the sub lenticule is below
Sub YCoOrdinateFind2(n, XDelta, xx, yy1, yy2, Flag)
'variable declarations are omitted for brevity
Flag = False
'start a course angle step and when the difference is no longer decreasing, back off and start a
smaller
'step size close by. Keep doing this until deltheta reaches a very small value.
xs = XInterlaceCenter(n)      'points for start of ray to be traced
ys = 0#
zs = 0#
'diff = 100000 'initialize the difference
k = 0
halfdelx = XDelta / 2#
xint = (xx − halfdelx)
zint = 0#
theta = −1.51 '(radians = −85.6 degrees)
deltheta = 0.001
diffmax = 100# 'starting point
While deltheta > 0.00000000001
        k = k + 1
        theta = theta + deltheta
        If Abs(theta) > 1.51 Then 'get out of loop, no angle was found to satisfy the ray direction
requirement
                Exit Sub
        End If
        dely = halfdelx * Tan(theta)
        yint = (yy1 + dely) 'center of line segment under consideration
        s1 = Sqr((xint − xs)^2 + (yint − ys)^2 + (zint − zs)^2)
        e1x = (xint − xs) / s1       'direction cosines of ray to be traced
        e1y(yint − ys) / s1
        e1z = (zint − zs) / s1
        xp = xint     'points on the plane perpendicular to line segment
        yp = yint
        zp = zint
        'normal to plane
        enx = −Sin(theta)
        eny = Cos(theta)
        enz = 0#
        Call intplane(xs, ys, zs, e1x, e1y, e1z, xp, yp, zp, enx, eny, enz, xi, yi, zi, intflag)
        If intflag = False Then
                MsgBox ("intplane returned no intersection in Ycoordinate2Find")
        End If
        an1 = IndexLenticule
        an2 = IndexAir
        Call refract(an1, an2, e1x, e1y, e1z, enx eny, enz, e2x, e2y, e2z, iflag)
        If iflag = 3 Then '(TIR)
                diffmax = 100#
        End If
        If iflag = 2 Then '(refraction)
                s10 = e2x − Sin(AngleLenticule(n))
                diff = Abs(s10)
                If diff < diffmax Then
                        diffmax = diff
                        Else              'if past minimum, back off and make smaller steps
                        theta = theta − 2# * deltheta   'back off angle
                        deltheta = deltheta / 3#         'decrease steps
                        diffmax = 100#            ' get a new starting point
                End If
        End If
Wend
    'check limit for slope (needed to prevent tool from clipping sharp point of sidewall and steepest
    slope.
    If SideWalls = "Hybrid" Then
            If Abs(theta) > ThetaSlopeLimitRadians Then
                    If theta >= 0 Then
                            theta = ThetaSlopeLimitRadians
                            Else
                            theta = −ThetaSlopeLimitRadians
```

-continued

```
                End if
            dely = halfdelx * Tan(theta)
        End If
    End If
End If
yy2 = yy1 + 2# * dely
If k < 2 Then
    MsgBox ("YCoordinatefind K < 2 (starting point of yy2 is not small enough.) xx=" & xx &"
yy1= "& yy1)
    Exit Sub
End If
Flag = True
End Sub
```

We claim:

1. A method of fabricating an assembly for displaying an interlaced image, comprising:
    providing a film of material that is at least translucent to light;
    creating a lens array in the film by forming a plurality of parallel lens sets on a first side of the film; and
    providing an interlaced image comprising sets of elongate image elements proximate to a second side of the film;
    wherein each of the lens set is paired with one of the sets of the image elements and each of the lens sets comprises a plurality of elongate lenses and
    wherein each of the lenses in each of the lens sets is configured to provide a lens-specific viewing angle with a focus line that differs from the focus line of the other lenses within the particular lens set.

2. The method of claim 1, wherein each of the lens sets comprises a center lens positioned centrally in the lens set and further comprises a first set of sides lenses extending from a first edge of the center lens and a second set of side lenses extending from a second edge of the center lens, the first set and second set comprising equivalent, even numbers of the side lenses.

3. The method of claim 2, wherein the lens-specific angles for the center lens and the side lenses in the first and second sets are equal and selected from the range of about 1 to 10 degrees.

4. The method of claim 2, wherein the number of side lenses in the first set equals the number of side lenses in the second set, each of the side lenses in the first set has a cross sectional shape that differs from the cross sectional shapes of the other side lenses, and the side lenses of the second set have cross sectional shapes that mirror an opposite one of the side lenses in the first set.

5. The method of claim 1, wherein each of the elongate lenses in each of the lens sets is mapped to a subset of the image elements in the corresponding paired set of the image elements and wherein the mapped subset comprises three or fewer of the image elements.

6. The method of claim 5, wherein each of the lenses of each of the lens sets is configured to focus light from one of the image elements in the mapped subset.

7. The method of claim 1, wherein the providing the interlaced image comprises printing the interlaced image directly onto the second side.

8. The method of claim 7, wherein the printing comprises web printing a rate of at least about 2,000 feet per minute and wherein the lens array has a thickness in the range of about 1 mil to about 5 mils.

9. The method of claim 1, wherein the providing the interlaced image comprises bonding with a layer of substantially transparent adhesive interposed between the interlaced image and the first side of the lens array.

10. The method of claim 9, wherein the adhesive is provided on the second side prior to the bonding and the bonding comprises thermally laminating the film to the interlaced image.

11. The method of claim 1, wherein the lens-specific viewing angles are additive to provide an overall viewing angle for the lens set.

12. The method of claim 1, wherein the lens array has a thickness of less than about 15 mils.

13. The method of claim 1, wherein the creating of the lens array comprises embossing the lens sets in the first side of the film.

14. The method of claim 1, wherein the forming of the lens sets comprises coating the first side of the film with a substantially clear coating and embossing the coating to contain the lens sets.

15. A method of producing devices for displaying interlaced images, comprising:
    providing a sheet of material having an interlaced image on one side comprising sets of image slices;
    providing a film of material that is substantially transparent to light, wherein the film has a thickness of less than about 15 mils;
    bonding a second side of the film to the side of the sheet having the interlaced image; and
    forming a lens array on a first side of the film, the lens array comprising lens microstructures, wherein each of the lens microstructures is aligned to one of the sets of image slices and wherein the forming occurs after the bonding of the film to the sheet having the interlaced image.

16. The method of claim 15, wherein each of the lens microstructures comprises:
    an elongate center lens with a focus direction;
    a first set of elongate side lenses extending parallel to the center lens and abutting a first side of the center lens, wherein the lenses of the first set each have a unique focus direction that differs from the focus direction of the center lens; and
    a second set of elongate side lenses extending parallel to the center lens and abutting a second side of the center lens, wherein the lenses of the first set each have a unique focus direction that differs from focus direction of the center lens.

17. The method of claim 16, wherein the lens microstructure has an overall viewing angle comprising a combination of an angular distribution of the center lens, an angular distribution of each of the lenses of the first set, and an angular distribution of each of the lenses of the second set.

18. The method of claim 17, wherein the each of the angular distributions is substantially equivalent and wherein the angular distributions are selected from the range of about 1 to 10 degrees.

19. The method of claim 16, wherein the first set of side lenses has a cross sectional shape that is a mirror image of a cross sectional shape of the second set of side lenses.

20. The method of claim 16, wherein the lens microstructure is configured for focusing on one of the sets of the image slices and wherein the center lens and each of the lenses in the first and second sets focuses on a subset of the image slices.

21. The method of claim 15, wherein the forming comprises embossing using a chilled roller having a surface contoured with a reverse image of the lens array and pressing the first side of the film after the film is heated to an embossing temperature.

22. The method of claim 21, wherein the bonding comprises thermal activating an adhesive previously applied to the second side of the film or to the side of the sheet having the interlaced image.

23. The method of claim 15, wherein the forming comprises cold embossing including applying pressure to imprint the lens array into the first side of the film and using a roller or die comprising a surface having a reverse image of the lens array.

24. The method of claim 15, wherein the forming comprising embossing performed with a flat die or cylindrical roller that has an embossing surface formed by engraving comprising photo emulsion with a laser as en exposing light source.

25. A method of forming a device for viewing interlaced images, comprising:
providing a sheet with an interlaced image comprising sets of image elements, each of the image elements having a predefined width;
providing a substrate with planar sides;
forming lens microstructures on one of the planar sides of the lens substrate, each lens microstructure comprising a plurality of lenses formed based on a single pattern of lenses; and
mating the lens substrate with the sheet such that one of the lens microstructures is paired with each of the sets of image elements of the interlaced image,
wherein each of the lenses in each of the sets focuses light passing through the lens substrate to about the predefined width and onto a paired one of the image elements, wherein substrate is formed of transparent material, and wherein the cross sectional shape of each of the lenses is selected to focus the light through a plurality of connected segments having differing focus lines onto the paired one of the image elements.

26. The method of claim 25, wherein the forming of the lens microstructures comprises coating the one of the planar sides with an ultraviolet (UV) activated coating having a thickness in a range of about 1 to about 5 mils, contacting the coating with a cylinder engraved with a mirror image of the plurality of lens microstructures, and curing the coating.

27. The method of claim 26, wherein the curing is performed concurrently with the contacting by the engraved cylinder by curing the coating with a UV beam directed through the engraved cylinder or through the lens substrate.

28. The method of claim 25, wherein each of the segments is defined by a slope to focus the light onto the paired one of the image elements, each of the defining slopes is unique for a particular one of the lenses.

29. The method of claim 25, further comprising bonding the sheet and the lens substrate and forming the device by cutting the bonded sheet and lens substrate, wherein the device is selected from the group of products consisting of a label, a decal, a poster, a billboard, a book or magazine cover, a media insert, or label, and a card.

30. The method of claim 25, wherein the forming of the lens microstructures comprises coating the one of the planar sides of the lens substrate with a substantially clear coating in a non-solid state, embossing the coating to contain the plurality of lens microstructures prior to full curing of the coating to a solid state, and curing the embossed coating to the solid state.

* * * * *